US010644828B2

(12) United States Patent
Rahman et al.

(10) Patent No.: US 10,644,828 B2
(45) Date of Patent: May 5, 2020

(54) METHOD AND APPARATUS FOR WIDEBAND CSI REPORTING IN AN ADVANCED WIRELESS COMMUNICATION SYSTEM

(71) Applicant: Samsung Electronics Co., Ltd., Suwon-si, Gyeonggi-do (KR)

(72) Inventors: Md Saifur Rahman, Plano, TX (US); Yuyang Wang, Austin, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/266,959

(22) Filed: Feb. 4, 2019

(65) Prior Publication Data

US 2019/0253181 A1 Aug. 15, 2019

Related U.S. Application Data

(60) Provisional application No. 62/628,517, filed on Feb. 9, 2018, provisional application No. 62/719,887, filed on Aug. 20, 2018.

(51) Int. Cl.
*H04L 1/00* (2006.01)
*H04B 7/06* (2006.01)
*H04B 17/309* (2015.01)

(52) U.S. Cl.
CPC ......... *H04L 1/0008* (2013.01); *H04B 7/0626* (2013.01); *H04B 7/0639* (2013.01); *H04B 17/309* (2015.01)

(58) Field of Classification Search
CPC .. H04B 7/0639; H04B 17/309; H04B 7/0626; H04B 7/0632; H04L 1/0008; H04L 1/0026; H04L 1/003; H04L 1/0031
See application file for complete search history.

(56) References Cited

U.S. PATENT DOCUMENTS

| 9,698,887 B2 * | 7/2017 | Geirhofer ............ H04B 7/0626 |
| 2012/0039279 A1 * | 2/2012 | Chen .................... H04L 1/1861 370/329 |

(Continued)

OTHER PUBLICATIONS

ISA/KR, International Search Report and Written Opinion of the International Searching Authority, International Application No. PCT/KR2019/001594, dated May 17, 2019, 8 pages.

(Continued)

*Primary Examiner* — Khanh C Tran

(57) ABSTRACT

A method of a user equipment (UE) in a wireless communication system is provided. The method comprises receiving, from a base station (BS), channel status information (CSI) configuration information for a wideband CSI (WB CSI), generating the WB CSI based on the CSI configuration information, determining a number of zero padding bits (N) based on the CSI configuration information, wherein the number of zero padding bits (N) is determined based on a maximum payload bits ($N_{max}$) over all WB CSI candidates and an actual payload bits ($N_{reported}$) for the generated WB CSI, generating an appended WB CSI by inserting N consecutive zero bits into the actual payload bits ($N_{reported}$) for the generated WB CSI, and transmitting, to the BS, the appended WB CSI over an uplink channel.

20 Claims, 16 Drawing Sheets

(56) References Cited

U.S. PATENT DOCUMENTS

| | | | |
|---|---|---|---|
| 2014/0126383 A1* | 5/2014 | Tong | H04L 1/0026 370/241 |
| 2014/0226612 A1 | 8/2014 | Kim et al. | |
| 2015/0146634 A1* | 5/2015 | Hwang | H04L 5/0057 370/329 |
| 2018/0006791 A1 | 1/2018 | Marinier et al. | |
| 2019/0081678 A1* | 3/2019 | Park | H04B 7/0626 |

OTHER PUBLICATIONS

Ericsson, "On CSI reporting," R1-1716349, 3GPP TSG-RAN WG1 Ad Hoc #3, Nagoya, Japan, Sep. 18-21, 2017, 10 pages.

Huawei, Hisilicon, "CSI feedback for Type I codebook," R1-1713763, 3GPP TSG RAN WG1 Meeting #90, Prague, Czech Republic, Aug. 21-25, 2017, 6 pages.

NTT Docomo, "Feedback Design for CSI Type I and Type II," R1-1716081, 3GPP TSG RAN WG1 Meeting NR#3, Nagoya, Japan, Sep. 18-21, 2017, 5 pages.

"3rd Generation Partnership Project; Technical Specification Group Radio Access Network; NR; Multiplexing and channel coding (Release 15)", 3GPP TS 38.212 V15.4.0, Dec. 2018, 97 pages.

"3rd Generation Partnership Project; Technical Specification Group Radio Access Network; NR; Physical layer procedures for data (Release 15)", 3GPP TS 38.214 V15.4.0, Dec. 2018, 102 pages.

"3rd Generation Partnership Project; Technical Specification Group Radio Access Network; Evolved Universal Terrestrial Radio Access (E-UTRA); Physical channels and modulation(Release 14)", 3GPP TS 36.211 V14.4.0, Sep. 2017, 197 pages.

"3rd Generation Partnership Project; Technical Specification Group Radio Access Network; Evolved Universal Terrestrial Radio Access (E-UTRA); Multiplexing and channel coding (Release 14)", 3GPP TS 36.212 V14.4.0, Sep. 2017, 198 pages.

"3rd Generation Partnership Project; Technical Specification Group Radio Access Network; Evolved Universal Terrestrial Radio Access (E-UTRA); Physical layer procedures(Release 14)", 3GPP TS 36.213 V14.4.0, Sep. 2017, 462 pages.

"3rd Generation Partnership Project; Technical Specification Group Radio Access Network; Evolved Universal Terrestrial Radio Access (E-UTRA); Medium Access Control (MAC) protocol specification (Release 14)", 3GPP TS 36.321 V14.4.0, Sep. 2017, 108 pages.

"3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.4.0, Sep. 2017, 753 pages.

"3rd Generation Partnership Project; Technical Specification Group Services and System Aspects; Feasibility Study on New Services and Markets Technology Enablers; Stage 1(Release 14)", 3GPP TR 22.891 V1.2.0, Nov. 2015, 96 pages.

* cited by examiner

METHOD AND APPARATUS FOR WIDEBAND CSI REPORTING IN AN ADVANCED WIRELESS COMMUNICATION SYSTEM

CROSS-REFERENCE TO RELATED APPLICATION(S) AND CLAIM OF PRIORITY

The present application claims priority to U.S. Provisional Patent Application Ser. No. 62/628,517, filed on Feb. 9, 2018; and U.S. Provisional Patent Application Ser. No. 62/719,887, filed on Aug. 20, 2018. The content of the above-identified patent documents is incorporated herein by reference.

TECHNICAL FIELD

The present disclosure relates generally to channel state information (CSI) reporting particularly, relates to wideband CSI reporting in an advanced wireless communication system.

BACKGROUND

Understanding and correctly estimating the channel in an advance wireless communication system between a user equipment (UE) and a base station (e.g., eNB and/or gNB) is important for efficient and effective wireless communication. In order to correctly estimate the channel conditions, the UE may report (e.g., feedback) information about channel measurement, e.g., CSI, to the eNB (e.g., gNB). With this information about the channel, the eNB is able to select appropriate communication parameters to efficiently and effectively perform wireless data communication with the UE.

SUMMARY

Embodiments of the present disclosure provide methods and apparatuses for wideband CSI reporting in an advanced wireless communication system.

In one embodiment, a user equipment (UE) in a wireless communication system is provided. The UE comprises a transceiver configured to receive, from a base station (BS), channel status information (CSI) configuration information for a wideband CSI (WB CSI). The UE further comprises a processor operably connected to the transceiver, the processor configured to generate the WB CSI based on the CSI configuration information, determine a number of zero padding bits (N) based on the CSI configuration information, wherein the number of zero padding bits (N) is determined based on a maximum payload bits ($N_{max}$) over all WB CSI candidates and an actual payload bits ($N_{reported}$) for the generated WB CSI, and generate an appended WB CSI by inserting N consecutive zero bits into the actual payload bits ($N_{reported}$) for the generated WB CSI, wherein the transceiver is further configured to transmit, to the BS, the appended WB CSI over an uplink channel.

In another embodiment, a base station (BS) in a wireless communication system is provided. The BS comprises a transceiver configured to transmit, to a user equipment (UE), channel status information (CSI) configuration information for a wideband CSI (WB CSI) and receive, from the UE, an appended WB CSI over an uplink channel, wherein the appended WB CSI is generated by inserting N consecutive zero bits into actual payload bits ($N_{reported}$) for the WB CSI that is generated based on the CSI configuration information, and wherein a number of zero padding bits (N) is determined based on a maximum payload bits ($N_{max}$) over all WB CSI candidates and the actual payload bits ($N_{reported}$) for the generated WB CSI.

In yet another embodiment, a method of a user equipment (UE) in a wireless communication system is provided. The method comprises receiving, from a base station (BS), channel status information (CSI) configuration information for a wideband CSI (WB CSI), generating the WB CSI based on the CSI configuration information, determining a number of zero padding bits (N) based on the CSI configuration information, wherein the number of zero padding bits (N) is determined based on a maximum payload bits ($N_{max}$) over all WB CSI candidates and an actual payload bits ($N_{reported}$) for the generated WB CSI, generating an appended WB CSI by inserting N consecutive zero bits into the actual payload bits ($N_{reported}$) for the generated WB CSI, and transmitting, to the BS, the appended WB CSI over an uplink channel.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
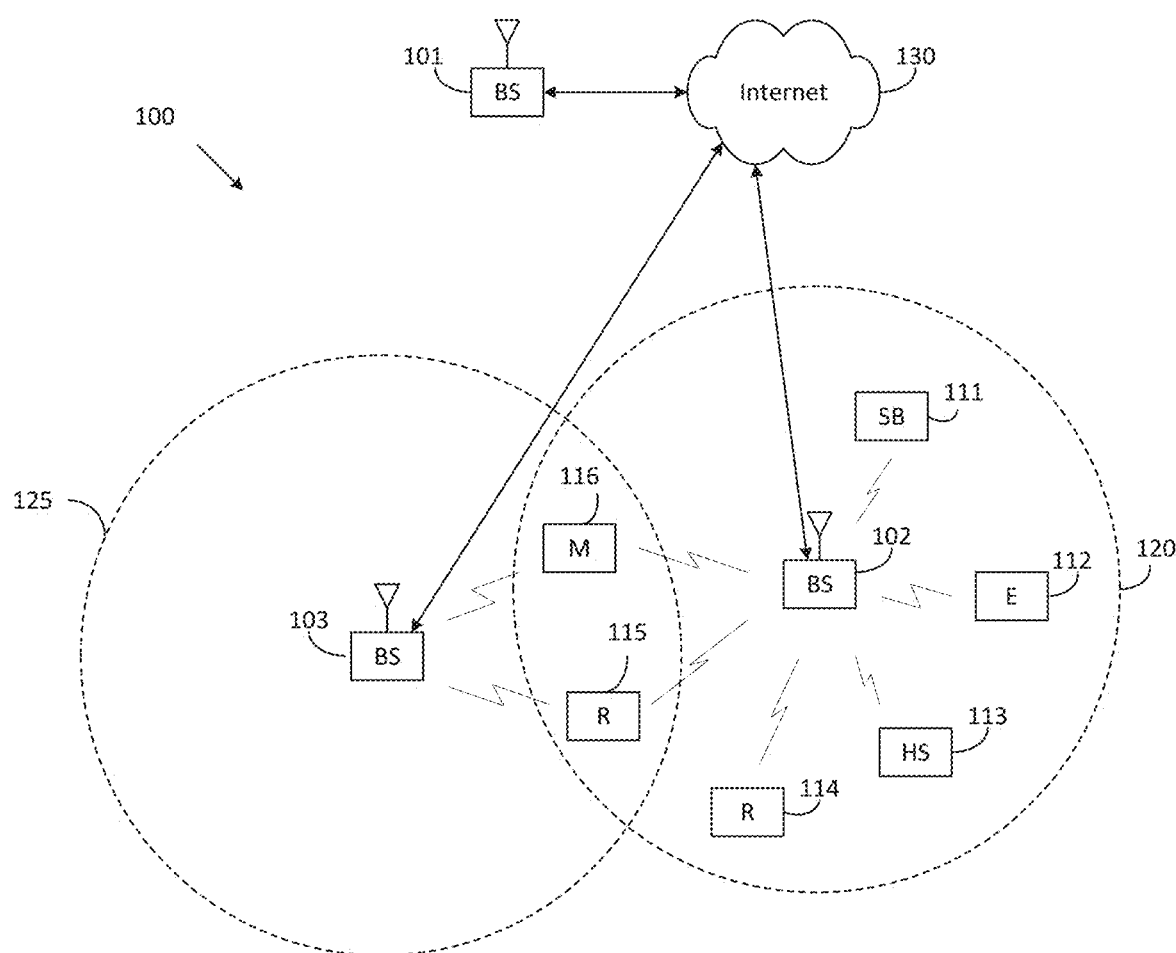
FIG. 1 illustrates an example wireless network according to embodiments of the present disclosure.

FIG. 1 through FIG. 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v14.4.0, "E-UTRA, Physical channels and modulation;" 3GPP TS 36.212 v14.4.0, "E-UTRA, Multiplexing and Channel coding;" 3GPP TS 36.213 v14.4.0, "E-UTRA, Physical Layer Procedures;" 3GPP TS 36.321 v14.4.0, "E-UTRA, Medium Access Control (MAC) protocol specification;" 3GPP TS 36.331 v14.4.0, "E-UTRA, Radio Resource Control (RRC) protocol specification;" 3GPP TR 22.891 v1.2.0; 3GPP TS 38.212 v15.4.0, "E-UTRA, NR, Multiplexing and Channel coding;" and 3GPP TS 38.214 v15.4.0, "E-UTRA, NR, Physical layer procedures for data."

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), this disclosure can be extended to other OFDM-based transmission waveforms or multiple access schemes such as filtered OFDM (F-OFDM).

The present disclosure covers several components which can be used in conjunction or in combination with one another, or can operate as standalone schemes.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 2:
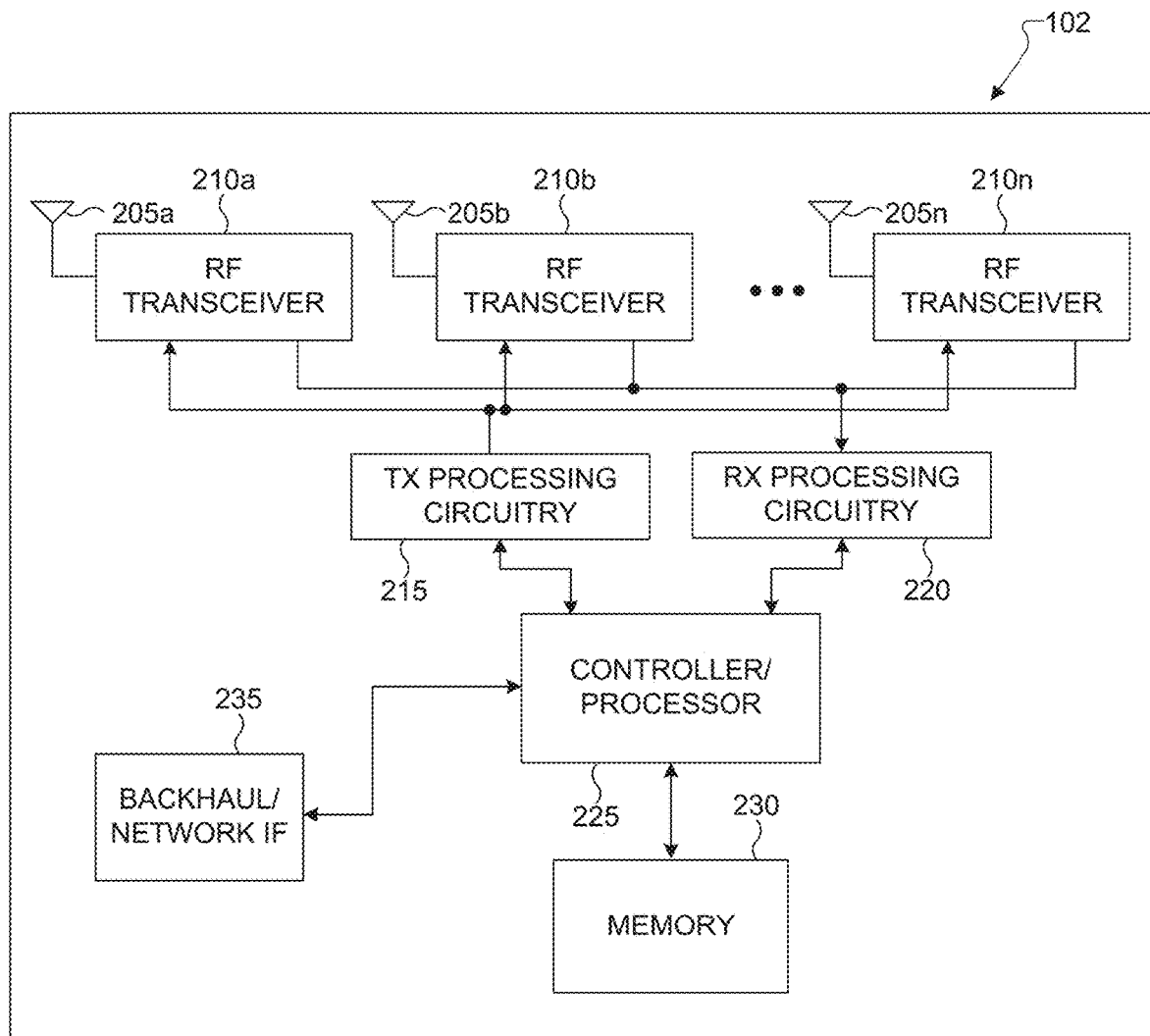
FIG. 2 illustrates an example gNB according to embodiments of the present disclosure.
Figure 3:
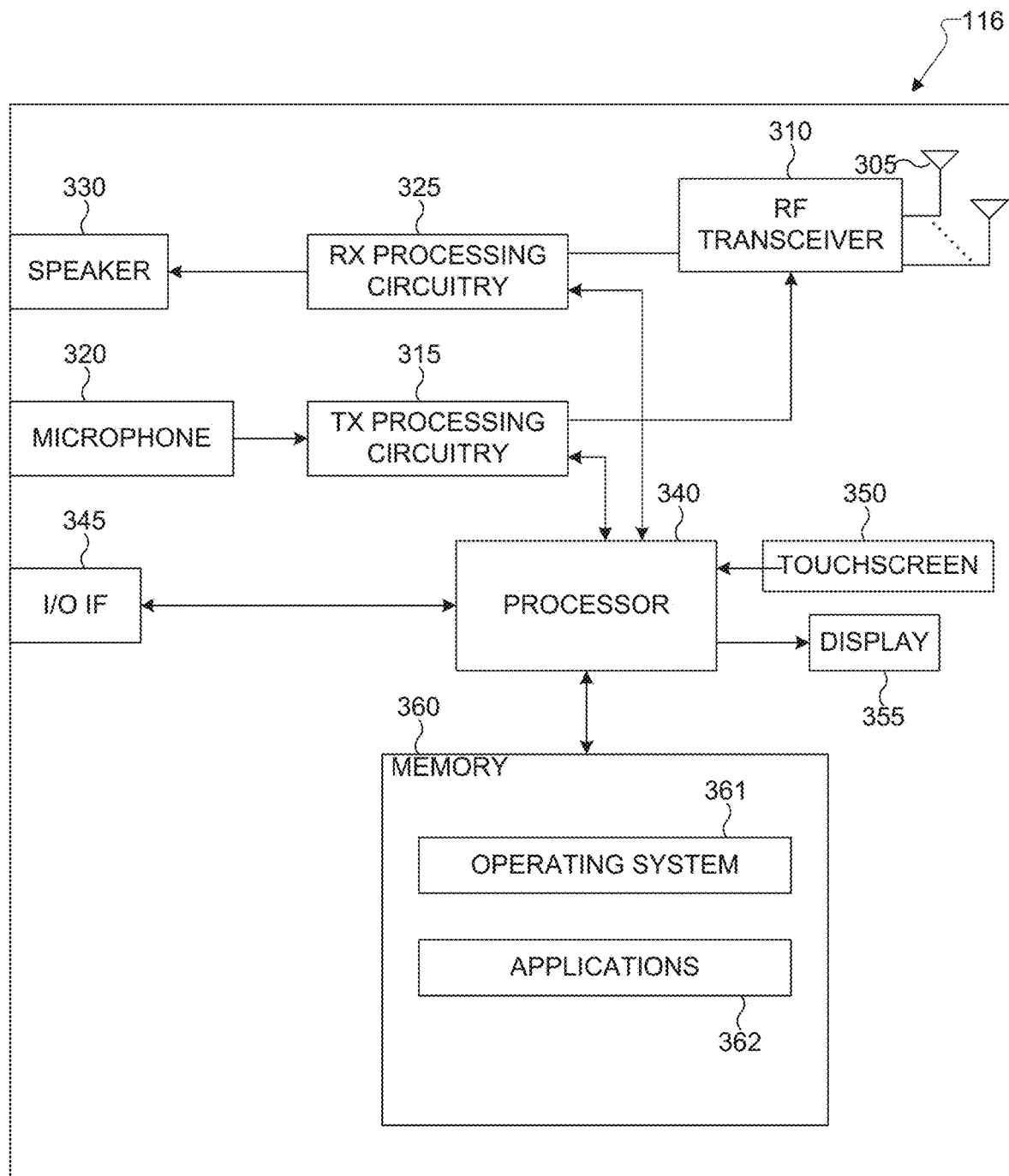
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for efficient wideband (WB) CSI reporting in an advanced wireless communication system. In certain embodiments, and one or more of the gNBs 101-103 includes circuitry, programing, or a combination thereof, for efficient WB CSI reporting in an advanced wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
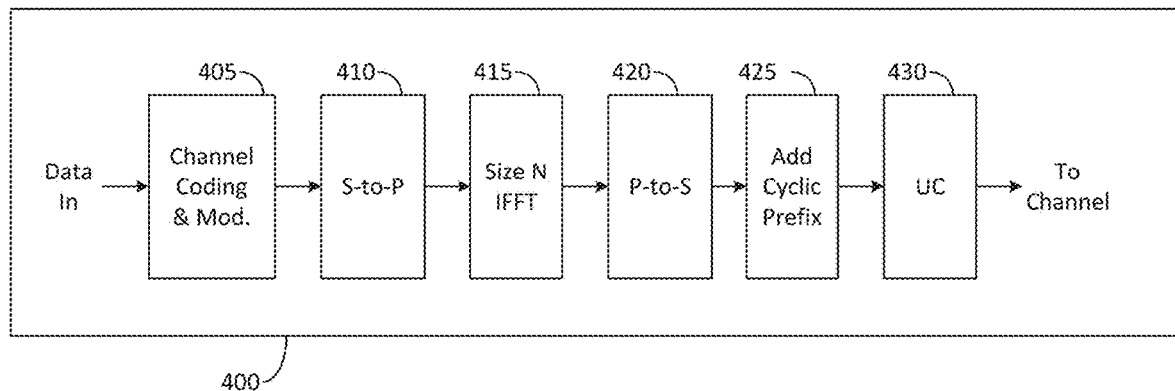
FIG. 4A illustrates a high-level diagram of an orthogonal frequency division multiple access transmit path according to embodiments of the present disclosure.
Figure 4B:
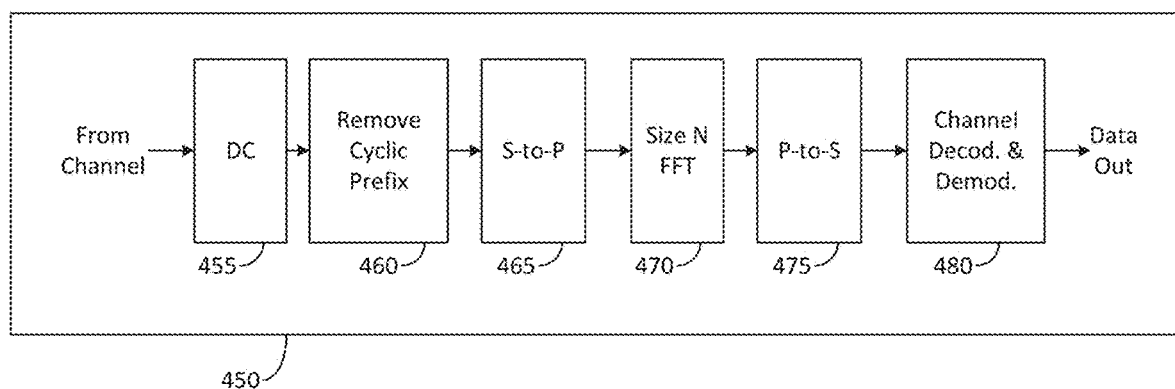
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB or gNB) 102 or a relay station, and the receive path circuitry may be implemented in a user equipment (e.g. user equipment 116 of FIG. 1). In other examples, for uplink communication, the receive path circuitry 450 may be implemented in a base station (e.g. gNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at the gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to the gNBs 101-103 and may implement a receive path corresponding to the architecture for receiving in the downlink from the gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH}=M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
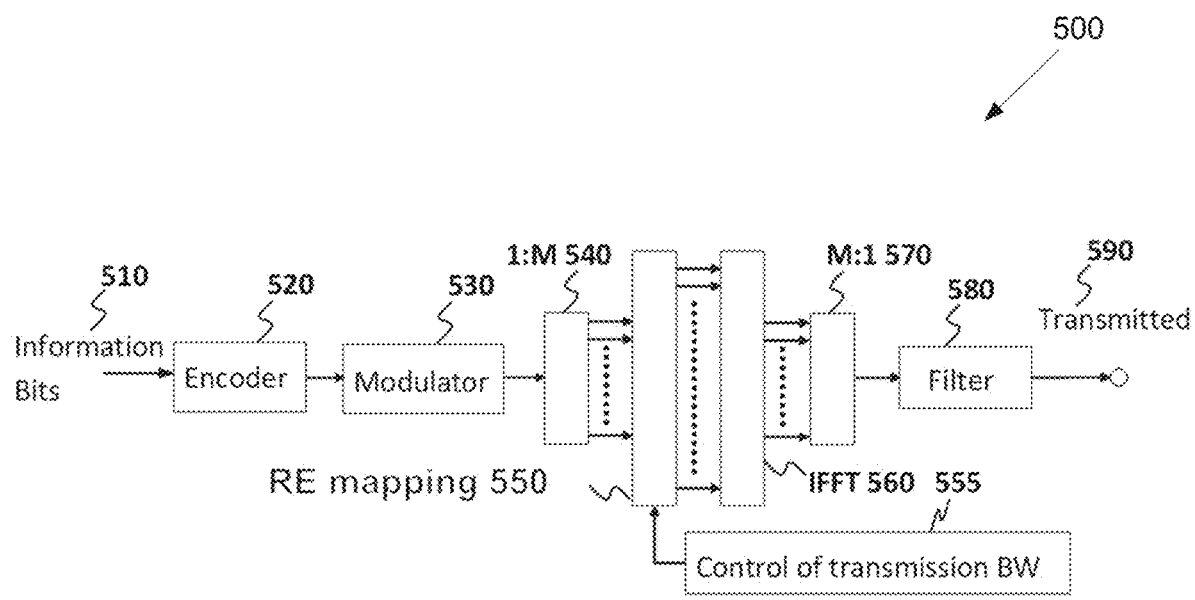
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
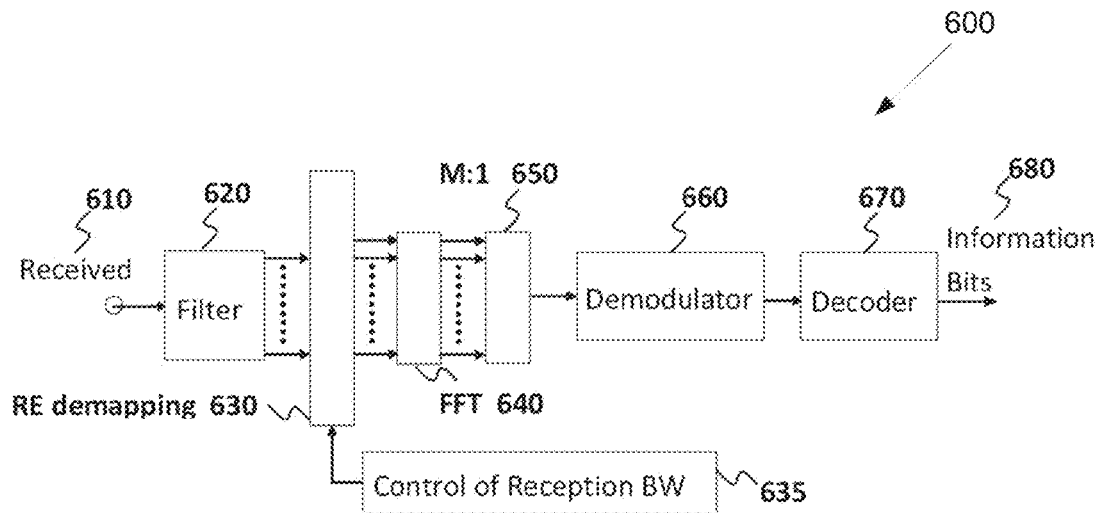
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
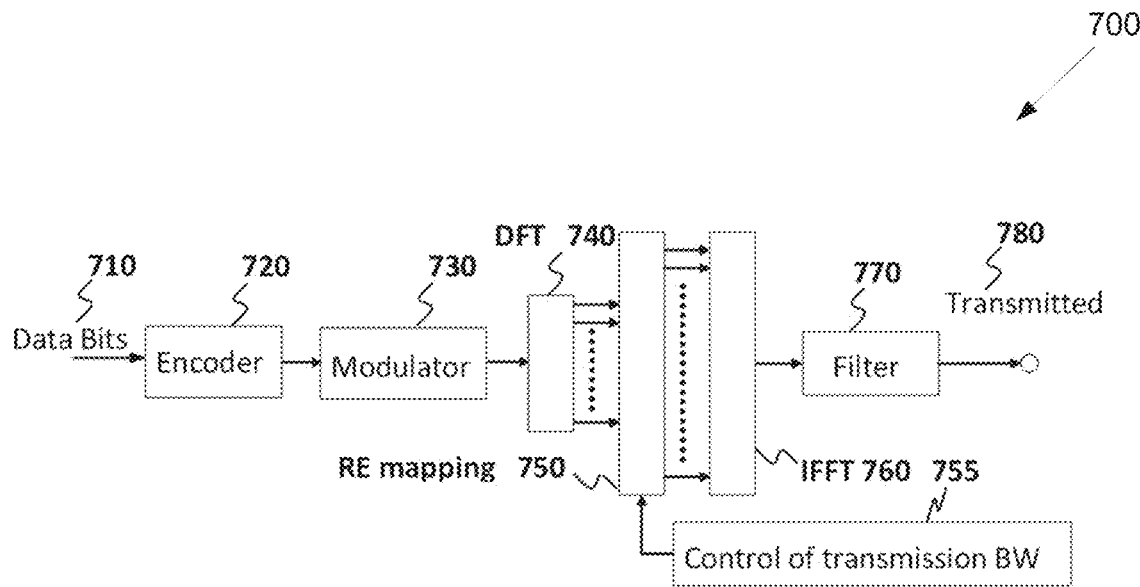
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
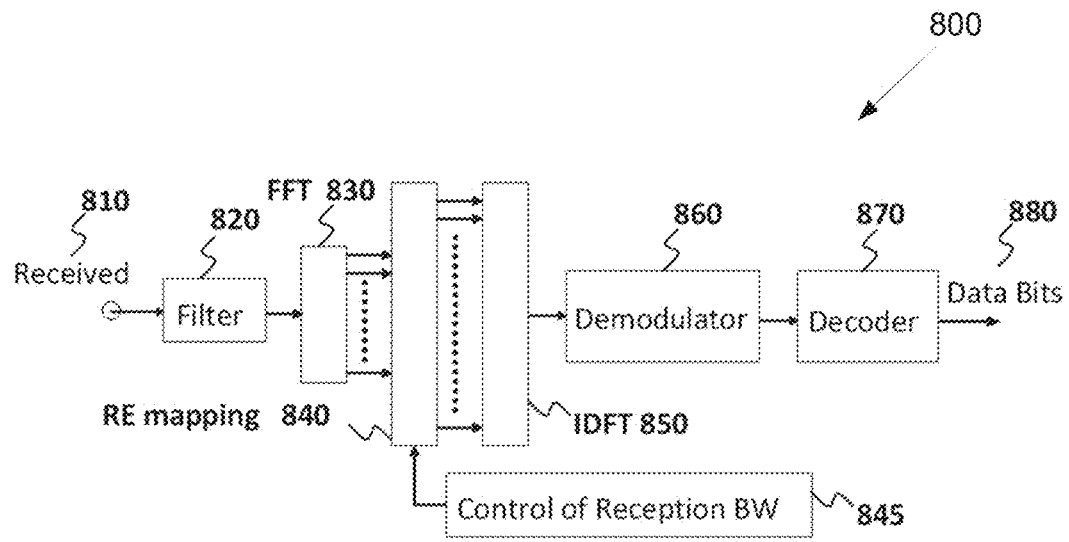
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed 'enhanced mobile broadband' (eMBB), targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per km² with less stringent the reliability, data rate, and latency requirements.

In order for the 5G network to support such diverse services with different quality of services (QoS), one method has been identified in 3GPP specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
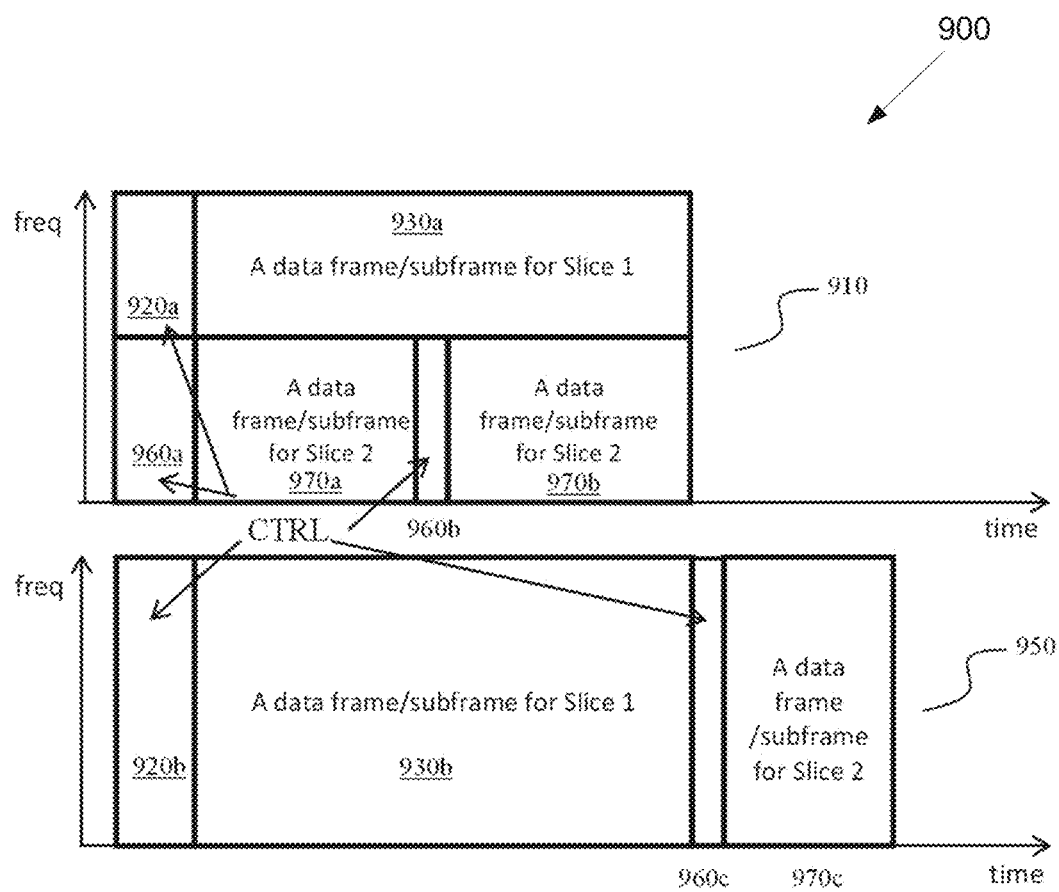
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. FIG. 9 does not limit the scope of this disclosure to any particular implementation of the multiplexing of two slices 900.

Two exemplary instances of multiplexing two slices within a common subframe or frame are depicted in FIG. 9. In these exemplary embodiments, a slice can be composed of one or two transmission instances where one transmission instance includes a control (CTRL) component (e.g., 920a, 960a, 960b, 920b, or 960c) and a data component (e.g., 930a, 970a, 970b, 930b, or 970c). In embodiment 910, the two slices are multiplexed in frequency domain whereas in embodiment 950, the two slices are multiplexed in time domain. These two slices can be transmitted with different sets of numerology.

3GPP specification supports up to 32 CSI-RS antenna ports which enable a gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
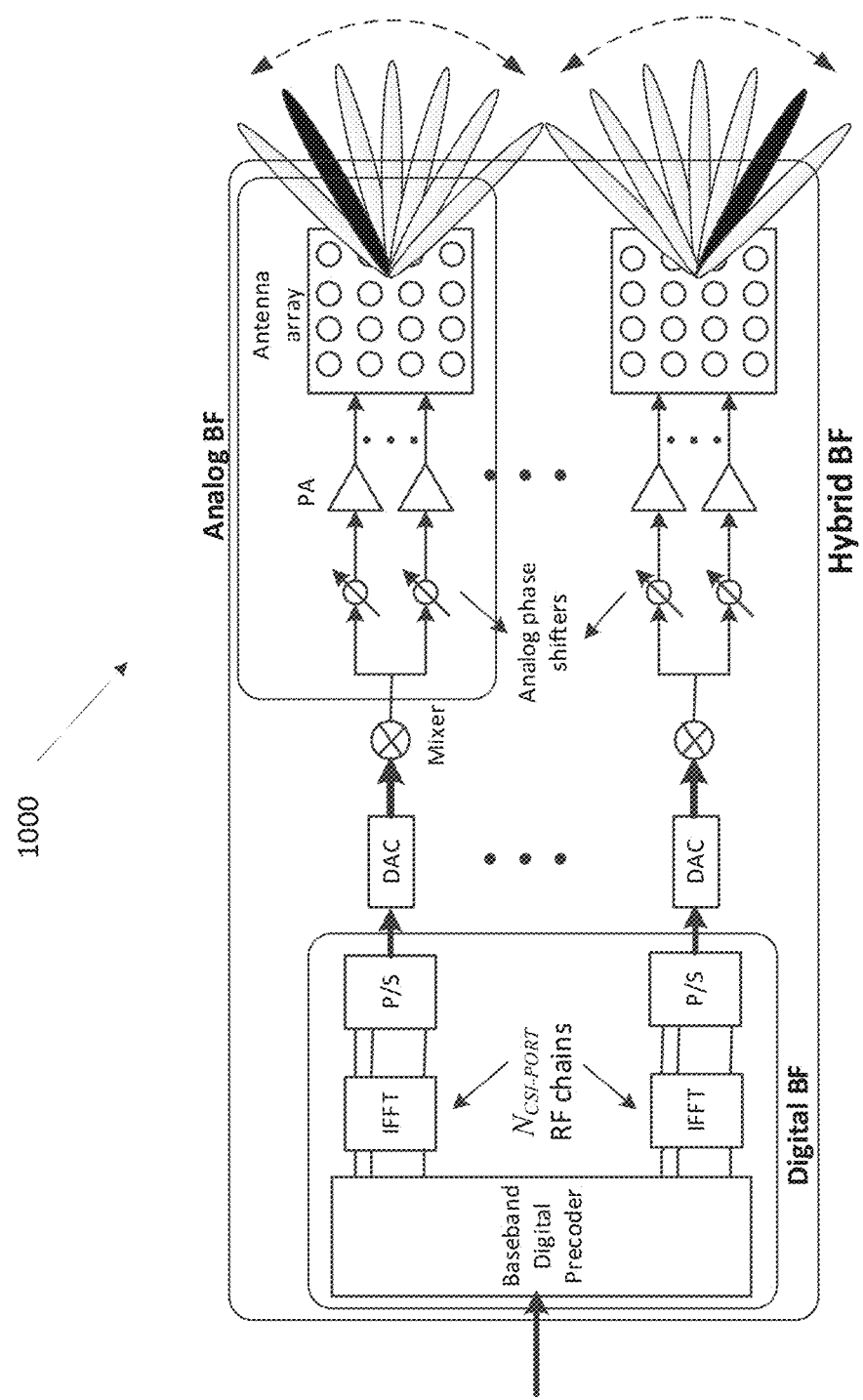
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG. 10 is for illustration only. FIG. 10 does not limit the scope of this disclosure to any particular implementation of the antenna blocks 1000.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

Figure 11:
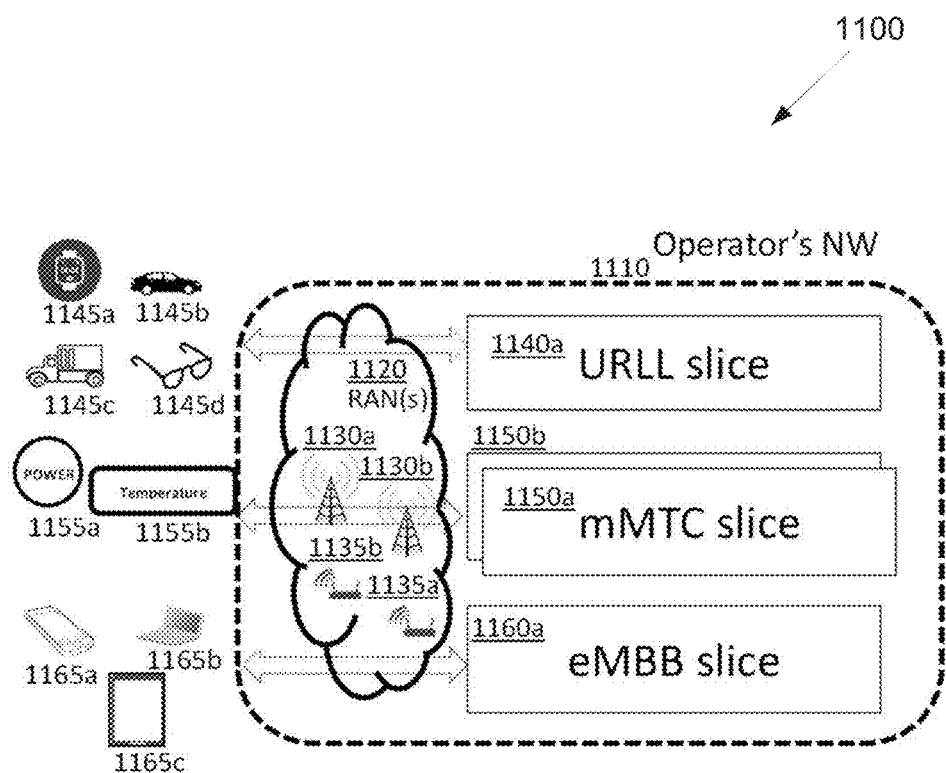
FIG. 11 illustrates an example network configuration according to embodiments of the present disclosure.

FIG. 11 illustrates an example network configuration 1100 according to embodiments of the present disclosure. The embodiment of the network configuration 1100 illustrated in FIG. 11 is for illustration only. FIG. 11 does not limit the scope of this disclosure to any particular implementation of the configuration 1100.

In order for the 5G network to support such diverse services with different quality of services (QoS), one scheme has been identified in 3GPP specification, called network slicing.

As shown in FIG. 11, An operator's network 1110 includes a number of radio access network(s) 1120 (RAN(s)) that are associated with network devices such as gNBs 1130a and 1130b, small cell base stations (femto/pico gNBs or Wi-Fi access points) 1135a and 1135b. The network 1110 can support various services, each represented as a slice.

In the example, an URLL slice 1140a serves UEs requiring URLL services such as cars 1145b, trucks 1145c, smart watches 1145a, and smart glasses 1145d. Two mMTC slices 1150a and 550b serve UEs requiring mMTC services such as power meters 555b, and temperature control box 1155b. One eMBB slice 1160a serves UEs requiring eMBB services such as cells phones 1165a, laptops 1165b, and tablets 1165c. A device configured with two slices can also be envisioned.

From 3GPP specification, MIMO has been identified as an important feature in order to achieve high system throughput requirements and MIMO may continue to be the same in NR. One of the components of a MIMO transmission scheme is the accurate CSI acquisition at the gNB (or TRP). For MU-MIMO, in particular, the availability of accurate CSI is necessary in order to guarantee high MU performance. For TDD systems, the CSI can be acquired using the SRS transmission relying on the channel reciprocity.

For FDD systems, on the other hand, it can be acquired using the CSI-RS transmission from a gNB, and CSI acquisition and feedback from UE. In FDD systems, the CSI feedback framework is "implicit" in the form of CQI/PMI/RI derived from a codebook assuming SU transmission from the gNB. Because of the inherent SU assumption while deriving CSI, this implicit CSI feedback is inadequate for MU transmission. Since future (e.g. NR) systems are likely to be more MU-centric, this SU-MU CSI mismatch may be a bottleneck in achieving high MU performance gains.

Another issue with implicit feedback is the scalability with larger number of antenna ports at the gNB.

For large number of antenna ports, the codebook design for implicit feedback is quite complicated (for example, in 3GPP specification, the total number of Class A codebooks=44), and the designed codebook is not guaranteed to bring justifiable performance benefits in practical deployment scenarios (for example, only a small percentage gain can be shown at the most). Realizing aforementioned issues, it has agreed to provide specification support to advanced CSI reporting in 3GPP specification, which, at the very least, can serve as a good starting point to design advanced CSI scheme in NR MIMO. Compared to 3GPP specification, the CSI acquisition for NR MIMO may consider the following additional differentiating factors.

In one example of flexibility CSI reporting framework, CSI reporting in NR may be flexible to support users with different CSI reporting capabilities. For example, some users may only be capable of reporting implicit CSI in the form of PMI/CQI/RI as in LTE and some other users may be capable of reporting both implicit as well as explicit channel reporting. In addition, UE motilities in NR can range from 0 kmph to 500 kmph. So, CSI reporting framework may be able to support such diverse use cases and UE capabilities.

In one example of increased number of antenna ports, in NR MIMO, the number of antenna elements at the gNB can be up to 256, which means that the total number of antenna ports can be more than 32, which is the maximum number of antenna ports supported in LTE eFD-MIMO. Although this can be accommodated with partial-port CSI-RS mapping where each subset includes at most 32 ports, the total number of ports across time can be extended to a much larger number. As the number of ports increases, meaningful system gain can only be obtained in a MU-centric system.

The following is supported for the Type I CSI reporting. In one example, periodic CSI reporting on PUCCH formats 2, 3, 4 supports Type I CSI with wideband frequency granularity. When the PUCCH carry Type I CSI with wideband frequency granularity, the CSI payload carried by the PUCCH format 2 and PUCCH formats 3, or 4 are identical and the same irrespective of RI (if reported) and CRI (if reported). In order to ensure the identical and the same CSI payload irrespective of RI (if reported) and CRI (if reported), the zero-padding bits are added (e.g., inserted).

TABLE 1

Mapping order of CSI fields of one CSI report, PMI-FormatIndicator = widebandPMI and CQI-FormatIndicator = widebandCQI

| CSI report number | CSI fields |
|---|---|
| CSI report #n | CRI as in 3GPP specification, if reported<br>Rank Indicator as in 3GPP specification, if reported<br>Layer Indicator as in 3GPP specification, if reported<br>Zero padding bits, if needed<br>PMI wideband information fields $X_1$, from left to right as in 3GPP specification, if reported<br>PMI wideband information fields $X_2$, from left to right as in 3GPP specification, if reported<br>Wideband CQI as in 3GPP specification, if reported<br>Indicator of the number of non-zero wideband amplitude coefficients$_{M_l}$ for layer l as in 3GPP specification, if reported |

A CSI Reporting Setting is said to have a wideband frequency-granularity if either; ReportQuantity is set to "CRI/RI/PMI/CQI," "CRI/RI/i1/CQI" or "CRI/RI/LI/PMI/CQI," CQI-FormatIndicator indicates single CQI reporting and PMI-FormatIndicator indicates single PMI reporting; ReportQuantity is set to "CRI/RI/i1" and PMI-FormatIndicator indicates single PMI reporting; ReportQuantity is set to "CRI/RI/CQI" and CQI-FormatIndicator indicates single CQI reporting; or ReportQuantity is set to "CRI/RSRP." Otherwise, the CSI Reporting Setting is said to have a subband frequency-granularity. In the present disclosure, an explicit rule is defined to calculate the number of zero padding bits for WB CSI reporting.

When the UE is configured with higher layer parameter CodebookType set to "TypeI-SinglePanel," the wideband CSI can comprise up to five components PMI ($i_1$, $i_2$), RI, CQI, LI, and CRI. The reporting payload (in number of bits) of the first PMI component or Codebook Index $i_1$ is summarized in TABLE 2, and the same for the second PMI component or Codebook Index $i_2$ is summarized in TABLE 3. The value to parameter Mode is configured via higher layer parameter CodebookMode.

TABLE 2 i1 payload (bits) for CodebookType = "TypeI-SinglePanel"

| Number of CSI-RS antenna ports, $P_{CSI-RS}$ | ($N_1$, $N_2$) | Rank 1 | | Rank 2 | | Rank 3-4 | Rank 5-6 | Rank 7-8 |
|---|---|---|---|---|---|---|---|---|
| | | Mode = 1 | Mode = 2 | Mode = 1 | Mode = 2 | | | |
| 2 | (1, 1) | — | — | — | — | — | — | — |
| 4 | (2, 1) | 3 | 2 | 4 | 3 | 3 | — | — |
| 8 | (2, 2) | 6 | 4 | 8 | 6 | 8 | 6 | 6 |
| | (4, 1) | 4 | 3 | 6 | 5 | 6 | 4 | 3 |
| 12 | (3, 2) | 7 | 5 | 9 | 7 | 9 | 7 | 6 |
| | (6, 1) | 5 | 4 | 7 | 6 | 7 | 5 | 5 |
| 16 | (4, 2) | 7 | 5 | 9 | 7 | 8 | 7 | 6 |
| | (8, 1) | 5 | 4 | 7 | 6 | 6 | 5 | 5 |
| 24 | (4, 3) | 8 | 6 | 10 | 8 | 9 | 8 | 8 |
| | (6, 2) | 8 | 6 | 10 | 8 | 9 | 8 | 7 |
| | (12, 1) | 6 | 5 | 8 | 7 | 7 | 6 | 6 |
| 32 | (4, 4) | 8 | 6 | 10 | 8 | 9 | 8 | 8 |
| | (8, 2) | 8 | 6 | 10 | 8 | 9 | 8 | 7 |
| | (16, 1) | 6 | 5 | 8 | 7 | 7 | 6 | 6 |

TABLE 3 i2 payload (bits) for CodebookType = "TypeI-SinglePanel"

| Number of CSI-RS antenna ports, $P_{CSI-RS}$ | Rank 1 Mode = 1 | Rank 1 Mode = 2 | Rank 2 Mode = 1 | Rank 2 Mode = 2 | Rank 3-4 | Rank 5-6 | Rank 7-8 |
|---|---|---|---|---|---|---|---|
| 2 | 2 | — | 1 | — | — | — | — |
| >2 | 2 | 4 | 1 | 3 | 1 | 1 | 1 |

The maximum payload to report RI (rank) is min(3, $\lceil \log_2 P_{CSI-RS} \rceil$) bits (assuming a maximum a 8 layers, i.e., rank 8, CSI can be reported) and that to report CQI is 4 bits if RI corresponds to rank≤4 and 8 bits if RI corresponds to rank >4. The payload (bits) to report RI and CQI is summarized in TABLE 4.

TABLE 4

RI and CQI reporting payload (bits) for CodebookType = "TypeI-SinglePanel"

| Number of CSI-RS antenna ports, $P_{CSI-RS}$ | Rank 1 Mode = 1 | Rank 1 Mode = 2 | Rank 2 Mode = 1 | Rank 2 Mode = 2 | Rank 3-4 | Rank 5-6 | Rank 7-8 |
|---|---|---|---|---|---|---|---|
| 2 | 5 | — | 5 | — | — | — | — |
| 4 | 6 | 6 | 6 | 6 | 6 | — | — |
| >4 | 7 | 7 | 7 | 7 | 7 | 11 | 11 |

The payload (bits) to report layer indicator (LI) is min(2, $\lceil \log_2 R \rceil$), where R corresponds to reported rank (via RI). The LI reporting payload is summarized in TABLE 5.

TABLE 5

LI reporting payload (bits)

| | Bitwidth | | |
|---|---|---|---|
| Field | Rank 1 | Rank 2 | Rank 3-8 |
| Layer Indicator | 0 | 1 | 2 |

Using TABLES 2 to 5, and assuming maximum payload to report CRI is 3 bits, the maximum total payload to report wideband CSI (comprising all components PMI $i_1$, $i_2$, RI, CQI, LI, CRI are reported) for CodebookType="TypeI-SinglePanel" is summarized in TABLE 6.

TABLE 6

Maximum WB CSI reporting payload (bits) for CodebookType = "TypeI-SinglePanel" and 3 bits CRI payload

| Number of CSI-RS antenna ports, $P_{CSI-RS}$ | $(N_1, N_2)$ | Rank 1 Mode = 1 | Rank 1 Mode = 2 | Rank 2 Mode = 1 | Rank 2 Mode = 2 | Rank 3-4 | Rank 5-6 | Rank 7-8 |
|---|---|---|---|---|---|---|---|---|
| 2 | (1, 1) | 10 | — | 10 | — | — | — | — |
| 4 | (2, 1) | 14 | 15 | 15 | 16 | 10 | — | — |
| 8 | (2, 2) | 18 | 18 | 20 | 20 | 21 | 23 | 23 |
|   | (4, 1) | 16 | 17 | 18 | 19 | 19 | 21 | 20 |
| 12 | (3, 2) | 19 | 19 | 21 | 21 | 22 | 24 | 23 |
|   | (6, 1) | 17 | 18 | 19 | 20 | 20 | 22 | 22 |
| 16 | (4, 2) | 19 | 19 | 21 | 21 | 21 | 24 | 23 |
|   | (8, 1) | 17 | 18 | 19 | 20 | 19 | 22 | 22 |
| 24 | (4, 3) | 20 | 20 | 22 | 22 | 22 | 25 | 25 |
|   | (6, 2) | 20 | 20 | 22 | 22 | 22 | 25 | 24 |
|   | (12, 1) | 18 | 19 | 20 | 21 | 20 | 23 | 23 |

TABLE 6-continued

Maximum WB CSI reporting payload (bits) for CodebookType = "TypeI-SinglePanel" and 3 bits CRI payload

| Number of CSI-RS antenna ports, $P_{CSI-RS}$ | $(N_1, N_2)$ | Rank 1 | | Rank 2 | | Rank 3-4 | Rank 5-6 | Rank 7-8 |
|---|---|---|---|---|---|---|---|---|
| | | Mode = 1 | Mode = 2 | Mode = 1 | Mode = 2 | | | |
| 32 | (4, 4) | 20 | 20 | 22 | 22 | 22 | 25 | 25 |
| | (8, 2) | 20 | 20 | 22 | 22 | 22 | 25 | 24 |
| | (16, 1) | 18 | 19 | 20 | 21 | 20 | 23 | 23 |

In one embodiment 1, when CodebookType="TypeI-SinglePanel," the number of zero padding bits to report WB CSI is then given by $N=N_{max}-N_{CSI}$, where $N_{CSI}=N_{reported}$ is the actual payload (bits) of the WB CSI that is reported in the current reporting instance (e.g. PUCCH slot), and $N_{max}$ is the maximum WB CSI payload (bits) that can be reported. In one example, the actual WB CSI payload is given by $N_{CSI}=N_{PMI}+N_{RI}+N_{CQI}+N_{LI}+N_{CRI}$ where: $N_{PMI}$ is the payload to report PMI component of the actual WB CSI that is reported (or if reported or if configured to be reported); $N_{RI}$ is the payload to report RI component of the actual WB CSI that is reported (or if reported or if configured to be reported); $N_{CQI}$ is the payload to report CQI component of the actual WB CSI that is reported (or if reported or if configured to be reported); $N_{LI}$ is the payload to report LI component of the actual WB CSI that is reported (or if reported or if configured to be reported); and $N_{CRI}$ is the payload to report CRI component of the actual WB CSI that is reported (or if reported or if configured to be reported)

Note that some of the components of the WB CSI may not be reported. For example, if number of CSI-RS resource is 1, then CRI is not reported. In other words, the actual WB CSI (that is reported) may comprise a subset of the five components mentioned above. For example, one of the following combinations is configured via (higher layer RRC parameter) Report Quantity: "CRI/RI/PMI/CQI," "CRI/RI/i1/CQI," "CRI/RI/LI/PMI/CQI," "CRI/RI/i1," "CRI/RI/CQI," and "CRI/RSRP."

In one example 1A, $N_{max}$ is determined considering all possible values of ($P_{CSI-RS}$, CodebookMode, CodebookConfigN1, Condebook-ConfigN2) codebook parameters for PMI reporting, RI-restriction parameter for RI reporting, number of CSI-RS resources (configured via higher layer) for CRI reporting, and higher layer configuration for LI reporting. Therefore: $N_{max}=25$ if maximum of number CSI-RS resources for CRI reporting is 8 (i.e. maximum 3 bits for CRI) as shown in TABLE 6; $N_{max}=26$ if maximum of number CSI-RS resources for CRI reporting is 16 (i.e. maximum 4 bits for CRI); $N_{max}=27$ if maximum of number CSI-RS resources for CRI reporting is 32 (i.e. maximum 5 bits for CRI); $N_{max}=28$ if maximum of number CSI-RS resources for CRI reporting is 64 (i.e. maximum 6 bits for CRI).

In one example 1B, $N_{max}$ is determined considering a subset of all possible values of values of the above-mentioned parameters in the aforementioned example 1A.

In one embodiment 2, when CodebookType="TypeI-SinglePanel," the higher layer signaling for rank restriction is taken into consideration while determining the number of bits for zero padding bits. In particular, the number of zero padding bits to report WB CSI is then given by $N=N_{max}-N_{CSI}$, where $N_{CSI}$ is the actual payload (bits) of the WB CSI that is reported in the current reporting instance (e.g. PUCCH slot) based on the set of allowed rank values (via higher layer rank restriction signaling), and $N_{max}$ is the maximum WB CSI payload (bits) that can be reported based on the set of allowed rank values (via higher layer rank restriction signaling). In other words, $N_{max}$ and $N_{CSI}$ are determined by considering only the set of rank values that are allowed via rank restriction.

When the UE is configured with higher layer parameter CodebookType set to "TypeI-MultiPanel," the wideband CSI can comprise up to five components PMI ($i_2$, $i_2$), RI, CQI, LI, and CRI. The reporting payload (in number of bits) of the first PMI component or Codebook Index $i_1$ is summarized in TABLE 7, and the same for the second PMI component or Codebook Index $i_2$ is summarized in TABLE 8. The value to parameter Mode is configured via higher layer parameter CodebookMode.

TABLE 7 i1 payload (bits) for CodebookType = "TypeI-MultiPanel"

| Number of CSI-RS antenna ports, $P_{CSI-RS}$ | $(N_g, N_1, N_2)$ | $(O_1, O_2)$ | Rank 1 | | Rank 2 | | Rank 3-4 | |
|---|---|---|---|---|---|---|---|---|
| | | | Mode = 1 | Mode = 2 | Mode = 1 | Mode = 2 | Mode = 1 | Mode = 2 |
| 8 | (2, 2, 1) | (4, 1) | 5 | 7 | 6 | 8 | 5 | 7 |
| 16 | (2, 4, 1) | (4, 1) | 6 | 8 | 8 | 10 | 8 | 10 |
| | (4, 2, 1) | (4, 1) | 9 | — | 10 | — | 9 | — |
| | (2, 2, 2) | (4, 4) | 8 | 10 | 10 | 12 | 10 | 12 |
| 32 | (2, 8, 1) | (4, 1) | 7 | 9 | 9 | 11 | 9 | 11 |
| | (4, 4, 1) | (4, 1) | 10 | — | 12 | — | 12 | — |
| | (2, 4, 2) | (4, 4) | 9 | 11 | 11 | 13 | 11 | 13 |
| | (4, 2, 2) | (4, 4) | 12 | — | 14 | — | 14 | — |

TABLE 8 i2 payload (bits) for CodebookType = "TypeI-MultiPanel"

| Number of CSI-RS antenna ports, $P_{CSI-RS}$ | Rank 1 | | Rank 2-4 | |
|---|---|---|---|---|
| | Mode = 1 | Mode = 2 | Mode = 1 | Mode = 2 |
| 8, 16, 32 | 2 | 4 | 1 | 3 |

Since for CodebookType='TypeI-MultiPanel' case, up to rank 4 CSI is supported and number of CSI-RS ports is at least 8, the maximum payload to report RI is 2 bits. The CQI payload is 4 bits since only one codeword is sufficient to report up to rank 4 CSI. Therefore, a maximum of 6 bits are needed to report RI and CQI in this case.

Using TABLE 5, TABLE 7, and TABLE 8, and assuming maximum payload to report CRI is 3 bits, the total payload to report wideband CSI (comprising all components PMI $i_1$, $i_2$, RI, CQI, LI, CRI are reported) for CodebookType="TypeI-MultiPanel" is summarized in TABLE 9.

In one example 3B, $N_{max}$ is determined considering a subset of all possible values of values of the above-mentioned parameters in the aforementioned example 3A.

In one embodiment 4, when CodebookType="TypeI-MultiPanel," the higher layer signaling for rank restriction is taken into consideration while determining the number of bits for zero padding bits. In particular, the number of zero padding bits to report WB CSI is then given by $N=N_{max}-N_{CSI}$, where $N_{CSI}$ is the actual payload (bits) of the WB CSI that is reported in the current reporting instance (e.g. PUCCH slot) based on the set of allowed rank values (via higher layer rank restriction signaling), and $N_{max}$ is the maximum WB CSI payload (bits) that can be reported based on the set of allowed rank values (via higher layer rank restriction signaling). In other words, $N_{max}$ and $N_{CSI}$ are determined by considering only the set of rank values that are allowed via rank restriction.

In one embodiment 5, the number of zero padding bits to report WB CSI is then given by $N=N_{max}-N_{CSI}$, where $N_{CSI}$ is the actual payload (bits) of the WB CSI that is reported in

TABLE 9

Maximum WB CSI reporting payload (bits) for CodebookType = 'TypeI-MultiPanel' and 3 bits CRI payload

| Number of CSI-RS antenna ports, $P_{CSI-RS}$ | $(N_g, N_1, N_2)$ | $(O_1, O_2)$ | Rank 1 | | Rank 2 | | Rank 3-4 | |
|---|---|---|---|---|---|---|---|---|
| | | | Mode = 1 | Mode = 2 | Mode = 1 | Mode = 2 | Mode = 1 | Mode = 2 |
| 8 | (2, 2, 1) | (4, 1) | 16 | 20 | 17 | 21 | 17 | 21 |
| 16 | (2, 4, 1) | (4, 1) | 17 | 21 | 19 | 23 | 20 | 24 |
| | (4, 2, 1) | (4, 1) | 20 | — | 21 | — | 21 | — |
| | (2, 2, 2) | (4, 4) | 19 | 23 | 21 | 25 | 22 | 26 |
| 32 | (2, 8, 1) | (4, 1) | 18 | 22 | 20 | 24 | 21 | 25 |
| | (4, 4, 1) | (4, 1) | 21 | — | 23 | — | 24 | — |
| | (2, 4, 2) | (4, 4) | 20 | 24 | 22 | 26 | 23 | 27 |
| | (4, 2, 2) | (4, 4) | 23 | — | 25 | — | 26 | — |

In one embodiment 3, when CodebookType="TypeI-MultiPanel," the number of zero padding bits to report WB CSI is then given by $N=N_{max}-N_{CSI}$, where $N_{CSI}$ is the actual payload (bits) of the WB CSI that is reported in the current reporting instance (e.g. PUCCH slot), and $N_{max}$ is the maximum WB CSI payload (bits) that can be reported. In one example, the actual WB CSI payload is given by $N_{CSI}=N_{PMI}+N_{RI}+N_{CQI}+N_{LI}+N_{CRI}$, where these component parameters are defined in the aforementioned embodiment 1. The rest of the details of embodiment 1 are applicable here too.

In one example 3A, $N_{max}$ is determined considering all possible values of ($P_{CSI-RS}$, CodebookMode, Codebook-ConfigNg, Codebook-ConfigN1, Condebook-ConfigN2) codebook parameters for PMI reporting, RI-restriction parameter for RI reporting, number of CSI-RS resources (configured via higher layer) for CRI reporting, and higher layer configuration for LI reporting. Therefore: $N_{max}=27$ if maximum of number CSI-RS resources for CRI reporting is 8 (i.e. maximum 3 bits for CRI) as shown in TABLE 9. $N_{max}=28$ if maximum of number CSI-RS resources for CRI reporting is 16 (i.e. maximum 4 bits for CRI); $N_{max}=29$ if maximum of number CSI-RS resources for CRI reporting is 32 (i.e. maximum 5 bits for CRI); and $N_{max}=30$ if maximum of number CSI-RS resources for CRI reporting is 64 (i.e. maximum 6 bits for CRI).

the current reporting instance (e.g. PUCCH slot), and $N_{max}$ is maximum WB CSI payload (bits) that can be reported. Note that the maximum is considered over all possible values (or payloads) of CSI components that can be reported. The number of zero padding bits is determined based on the higher layer parameter ReportQuantity that configures the CSI components for CSI reporting.

When higher layer parameter ReportQuantity is set to "CRI/RSRP," N=0 since the payloads of both CRI and RSRP are fixed (e.g. via higher layer configuration) and hence can take only one value.

When higher layer parameter ReportQuantity is set to "CRI/RI/CQI" and higher layer parameter CQI-FormatIndicator=widebandCQI indicating WB CQI reporting, N is determined according to TABLE 10. Since the payloads of both CRI and RI are fixed (e.g. via higher layer configuration) and hence can take only one value, the payloads don't contribute to the value of N, and only CQI determines N since it can be two values: 4 bits if RI corresponds to rank <=4 and 8 bits if RI corresponds to rank >4.

TABLE 10

Zero padding bits for ReportQuantiy = "CRI/RI/CQI"

| Field | 2 antenna ports | 4 antenna ports | >4 antenna ports Rank > 4 is not allowed | >4 antenna ports Rank <= 4 is not allowed | >4 antenna ports Both Rank > 4 and Rank <= 4 are allowed | |
|---|---|---|---|---|---|---|
| CRI | $\lceil \log_2 n_{CSI-RS} \rceil$ | $\lceil \log_2 n_{CSI-RS} \rceil$ | $\lceil \log_2 n_{CSI-RS} \rceil$ | $\lceil \log_2 n_{CSI-RS} \rceil$ | $\lceil \log_2 n_{CSI-RS} \rceil$ | |
| Rank Indicator | min(1,$\lceil \log_2 n_{RI} \rceil$) | min(2,$\lceil \log_2 n_{RI} \rceil$) | $\lceil \log_2 n_{RI} \rceil$ | $\lceil \log_2 n_{RI} \rceil$ | $\lceil \log_2 n_{RI} \rceil$ | |
| Wide-band CQI | 4 | 4 | 4 | 8 | 4 or 8 (implies that $N_{max}$ considers 8 bits for CQI) | |
| Zero padding bits | 0 | 0 | 0 | 0 | Rank <= 4 is reported (implies actual CQI is 4 bits) 4 | Rank > 4 is reported (implies actual CQI is 8 bits) 0 |

Here, $n_{CSI-RS}$ is the number of CSI-RS resources configured for CSI reporting. $n_{RI}$ is defined as follows. For CodebookType="TypeI-SinglePanel," if the higher layer parameter Number_CQI is not configured or Number_CQI=1, $n_{RI}$ is the number of allowed rank indicator values in the 4 LSBs of the higher layer parameter TypeI-SinglePanel-RI-Restriction; otherwise $n_{RI}$ is the number of allowed rank indicator values. For CodebookType="TypeI-MultiPanel," $n_{RI}$ is the number of allowed rank indicator values.

When higher layer parameter ReportQuantity is set to "CRI/RI/i1" and higher layer parameter PMI-FormatIndicator=widebandPMI indicating WB PMI reporting, N is determined according to TABLE 11.

In one alternative (Alt 5A), "CRI/RI/i1" reporting is supported only when CodebookType="TypeI-SinglePanel" and number of CSI-RS antenna ports is >2.

In another alternative (Alt 5B), "CRI/RI/i1" reporting is supported only when CodebookType="TypeI-SinglePanel" and number of CSI-RS antenna ports is >=2.

In another alternative (Alt 5C), "CRI/RI/i1" reporting is supported for both when CodebookType="TypeI-SinglePanel" and CodebookType="TypeI-MultiPanel." At least one of these alternatives may be supported in the specification.

When ReportQuantity is set to 'CRI/RI/i1/CQI', CQI-FormatIndicator=widebandCQI indicating WB CQI reporting and PMI-FormatIndicator indicates single PMI reporting, N is determined according to TABLE 12.

In one alternative (Alt 5D), "CRI/RI/i1/CQI" reporting is supported only when CodebookType="TypeI-SinglePanel" and number of CSI-RS antenna ports is >2.

In another alternative (Alt 5E), "CRI/RI/i1/CQI" reporting is supported only when CodebookType="TypeI-SinglePanel" and number of CSI-RS antenna ports is >=2.

In another alternative (Alt 5F), "CRI/RI/i1/CQI" reporting is supported for both when CodebookType="TypeI-SinglePanel" and CodebookType="TypeI-MultiPanel."

At least one of these alternatives may be supported in the specification.

TABLE 11

Zero padding bits for ReportQuantity = "CRI/RI/i1"

| Field | 2 antenna ports | 4 antenna ports | >4 antenna ports |
|---|---|---|---|
| CRI | $\lceil \log_2 n_{CSI-RS} \rceil$ | $\lceil \log_2 n_{CSI-RS} \rceil$ | $\lceil \log_2 n_{CSI-RS} \rceil$ |
| Rank Indicator | min(1, $\lceil \log_2 n_{RI} \rceil$) | min(2, $\lceil \log_2 n_{RI} \rceil$) | $\lceil \log_2 n_{RI} \rceil$ |
| i1 | 0 | Set $S_{i1}$ = i1 bitwidth (cf. TABLE 2 or TABLE 7) for the allowed rank values | |
| Zero padding bits | 0 | Max bitwidth over $S_{i1}$- reported i1 bitwidth | |

TABLE 12

Zero padding bits for ReportQuantity = "CRI/RI/i1/CQI"

| Field | Bitwidth | | |
|---|---|---|---|
| | 2 antenna ports | 4 antenna ports | >4 antenna ports |
| CRI | $\lceil \log_2 n_{CSI-RS} \rceil$ | $\lceil \log_2 n_{CSI-RS} \rceil$ | $\lceil \log_2 n_{CSI-RS} \rceil$ |
| Rank Indicator | $\min(1, \lceil \log_2 n_{RI} \rceil)$ | $\min(2, \lceil \log_2 n_{RI} \rceil)$ | $\lceil \log_2 n_{RI} \rceil$ |
| i1 | 0 | Set $S_{i1}$ = i1 bitwidth (cf. TABLE 2 or TABLE 7) for the allowed rank values | |
| CQI | 4 | Set $S_{CQI}$ = CQI bitwidth belonging to {4, 8} for the allowed rank values | |
| Zero padding bits | 0 | Max bitwidth over $S_{i1}$ and $S_{CQI}$ - reported i1 and CQI bitwidth | |

When ReportQuantity is set to "CRI/RI/PMI/CQI," CQI-FormatIndicator=widebandCQI indicating WB CQI reporting and PMI-FormatIndicator=widebandPMI indicating WB PMI reporting, N is determined according to TABLE 13.

TABLE 13

Zero padding bits for ReportQuantity = 'CRI/RI/PMI/CQI'

| Field | Bitwidth | | |
|---|---|---|---|
| | 2 antenna ports | 4 antenna ports | >4 antenna ports |
| CRI | $\lceil \log_2 n_{CSI-RS} \rceil$ | $\lceil \log_2 n_{CSI-RS} \rceil$ | $\lceil \log_2 n_{CSI-RS} \rceil$ |
| Rank Indicator | $\min(1, \lceil \log_2 n_{RI} \rceil)$ | $\min(2, \lceil \log_2 n_{RI} \rceil)$ | $\lceil \log_2 n_{RI} \rceil$ |
| PMI | Set $S_{PMI}$ = PMI bitwidth belonging to {1, 2} for the allowed rank values | Set $S_{PMI}$ = (i1, i2) bitwidth (cf. TABLE 2 or TABLE 7) for the allowed rank values | |
| CQI | 4 | Set $S_{CQI}$ = CQI bitwidth belonging to {4, 8} for the allowed rank values | |
| Zero padding bits | 0 | Max bitwidth over $S_{PMI}$ and $S_{CQI}$ - reported PMI and CQI bitwidth | |

When ReportQuantity is set to "CRI/RI/LI/PMI/CQI," CQI-FormatIndicator indicates single CQI reporting and PMI-FormatIndicator=widebandPMI indicating WB PMI reporting, N is determined according to TABLE 14.

TABLE 14

Zero padding bits for ReportQuantity = "CRI/RI/LI/PMI/CQI"

| Field | Bitwidth | | |
|---|---|---|---|
| | 2 antenna ports | 4 antenna ports | >4 antenna ports |
| CRI | $\lceil \log_2 n_{CSI-RS} \rceil$ | $\lceil \log_2 n_{CSI-RS} \rceil$ | $\lceil \log_2 n_{CSI-RS} \rceil$ |
| Rank Indicator | $\min(1, \lceil \log_2 n_{RI} \rceil)$ | $\min(2, \lceil \log_2 n_{RI} \rceil)$ | $\lceil \log_2 n_{RI} \rceil$ |
| LI | Set $S_{LI}$ = LI bitwidth belonging to {0, 1} for the allowed rank values | Set $S_{LI}$ = LI bitwidth belonging to {0, 1, 2} for the allowed rank values | |
| PMI | Set $S_{PMI}$ = PMI bitwidth belonging to {1, 2} for the allowed rank values | Set $S_{PMI}$ = (i1, i2) bitwidth (cf. TABLE 2 or TABLE 7) for the allowed rank values | |
| CQI | 4 | Set $S_{CQI}$ = CQI bitwidth belonging to {4, 8} for the allowed rank values | |
| Zero padding bits | 0 | Max bitwidth over $S_{LI}$, $S_{PMI}$ and $S_{CQI}$ - reported LI, PMI and CQI bitwidth | |

In one embodiment 6, to keep the number of WB CSI payload fixed, zero padding bits are added (e.g. as shown in TABLE 1). The number of zero padding bits is $N = N_{max} - N_{reported}$, where $N_{max}$ is the maximum payload (bits) of the WB CSI that can be reported, and $N_{reported}$ is the actual payload (bits) of the WB CSI that is reported. If the payload of a CSI component that is reported as a part of the WB CSI is fixed, it doesn't contribute to determine the value of N. If the payload of a CSI component that is reported as a part of the WB CSI can vary, it can contribute to determine the value of N. An example is provided next.

In 5G NR, the payload (bits) of RI reporting does not change once higher layer codebook related parameters are configured to the UE. A few examples of higher layer parameter are as follows: a number of CSI-RS antenna ports ($P_{CSI-RS}$); Codebook-ConfigN1; Codebook-ConfigN2; CodebookType; CodebookMode; TypeI-SinglePanel-2Tx-CodebookSubsetRestriction for rank restriction for 2 CSI-RS antenna ports and single antenna panel case; TypeI-SinglePanel-RI-Restriction for rank restriction for >2 CSI-RS antenna ports and single antenna panel case; and TypeI-MultiPanel-RI-Restriction for rank restriction for multiple antenna panel case.

Likewise, the payload (bits) of CRI does not change once higher layer parameters such as number of CSI-RS resources for CSI reporting is configured to the UE. However, the payload of PMI or CQI or LI reporting (if configured to be reported) can change, for example, depending on the rank that is reported via RI. Therefore, while RI and CRI do not contribute, PMI, CQI, or LI can contribute to determine the value of N. At least one of the following schemes can be used.

In one embodiment, the number of zero padding bits for WB CSI reporting is determined based on the possible payload values for PMI, CQI, and LI that can be reported. If any of PMI, CQI, or LI is not reported (or configured not to be reported), then it is not considered to determine the number of zero padding bits. In one example, the payload of zero padding bits is determined according to TABLE 15. In another example, the payload of zero padding bits is determined according to TABLE 16.

TABLE 16

Payload or bitwidth of zero padding bits

| CSI field | Bitwidth |
| --- | --- |
| Zero padding bits | $N = N_{max} - N_{reported}$ |

$N_{reported} = B(R)$, where $R$ = reported rank
$N_{max} = \max_{r \in S_{Rank}} B(r)$, where $S_{Rank}$ = set of rank values (r) that are allowed to be reported
For 2 CSI-RS ports: $B(r) = N_{PMI}(r) + N_{CQI}(r) + N_{LI}(r)$
For >2 CSI-RS ports: $B(r) = N_{PMI\ i_1}(r) + N_{PMI\ i_2}(r) + N_{CQI}(r) + N_{LI}(r)$
Payload $N_{PMI}(1) = 2$ and $N_{PMI}(2) = 1$ if PMI is reported; $N_{PMI}(r) = 0$ otherwise
Payload $N_{PMI\ i_1}(r)$ as in 3GPP specification if PMI i1 is reported; $N_{PMI\ i_1}(r) = 0$ otherwise
Payload $N_{PMI\ i_2}(r)$ as in 3GPP specification if PMI i2 is reported; $N_{PMI\ i_2}(r) = 0$ otherwise
Payload $N_{CQI}(r)$ as in 3GPP specification if CQI is reported; $N_{CQI}(r) = 0$ otherwise
Payload $N_{LI}(r)$ as in 3GPP specification if LI is reported; $N_{LI}(r) = 0$ otherwise In another embodiment, the number of zero padding bits for WB CSI reporting is determined based on the possible payload values for PMI and LI that can be reported. If any of PMI or LI is not reported (or configured not to be reported), then it is not considered to determine the number of zero padding bits. In one example, the payload of zero padding bits is determined according to a variation of

TABLE 15

Payload of zero padding bits

| CodebookType | Number of CSI-RS ports, $P_{CSI-RS}$ | CSI components | Payload for rank, r | | | | | | | |
| --- | --- | --- | --- | --- | --- | --- | --- | --- | --- | --- |
| | | | r = 1 | r = 2 | r = 3 | r = 4 | r = 5 | r = 6 | r = 7 | r = 8 |
| TypeI-SinglePanel | 2 | PMI, $N_{PMI}(r)$ | 2 | 1 | | | | | | |
| | | CQI, $N_{CQI}(r)$ | 4 | 4 | | | | | | |
| | | LI, $N_{LI}(r)$ | 0 | 1 | | | | | | |
| | 4 | PMI i1, $N_{PMI\ i_1}(r)$ | As in 3GPP specification | | | | | | | |
| | | PMI i2, $N_{PMI\ i_2}(r)$ | As in 3GPP specification | | | | | | | |
| | | CQI, $N_{CQI}(r)$ | 4 | 4 | 4 | 4 | | | | |
| | | LI, $N_{LI}(r)$ | 0 | 1 | 2 | 2 | | | | |
| | >4 | PMI i1, $N_{PMI\ i_1}(r)$ | | | | | | | | |
| | | PMI i2, $N_{PMI\ i_2}(r)$ | As in 3GPP specification | | | | | | | |
| | | CQI, $N_{CQI}(r)$ | 4 | 4 | 4 | 4 | 8 | 8 | 8 | 8 |
| | | LI, $N_{LI}(r)$ | 0 | 1 | 2 | 2 | 2 | 2 | 2 | 2 |
| TypeI-MultiPanel | 8, 16, 32 | PMI i1, $N_{PMI\ i_1}(r)$ | As in 3GPP specification | | | | | | | |
| | | PMI i2, $N_{PMI\ i_2}(r)$ | As in 3GPP specification | | | | | | | |
| | | CQI, $N_{CQI}(r)$ | 4 | 4 | 4 | 4 | | | | |
| | | LI, $N_{LI}(r)$ | 0 | 1 | 2 | 2 | | | | | where number of zero padding bits $N = N_{max} - N_{reported}$
$N_{max} = r \in S_{Rank}^{max} B(r)$
$S_{Rank}$ = set of rank values (r) that are allowed for CSI reporting
$N_{reported} = B(R)$, $R$ = reported rank
For 2 CSI-RS ports: $B(r) = N_{PMI}(r) + N_{CQI}(r) + N_{LI}(r)$
For 2 CSI-RS ports: $B(r) = N_{PMI\ i_1}(r) + N_{PMI\ i_2}(r) + N_{CQI}(r) + N_{LI}(r)$
$N_{PMI}(r) = 0$ if PMI is not reported (or not configured to be reported)
$N_{PMI\ i_1}(r) = 0$ if PMI i1 is not reported (or not configured to be reported)
$N_{PMI\ i_2}(r) = 0$ if PMI i2 is not reported (or not configured to be reported)
$N_{CQI}(r) = 0$ if CQI is not reported (or not configured to be reported)
$N_{LI}(r) = 0$ if LI is not reported (or not configured to be reported)

TABLE 15 in which the dependence on $N_{CQI}(r)$ is removed, or by setting $N_{CQI}(r)=0$ in B(r). In another example, the payload of zero padding bits is determined according to a variation of TABLE 16 in which the dependence on $N_{CQI}(r)$ is removed, or by setting $N_{CQI}(r)=0$ in B(r).

In another embodiment, the number of zero padding bits for WB CSI reporting is determined based on the possible payload values for PMI and CQI that can be reported. If any of PMI or CQI is not reported (or configured not to be reported), then it is not considered to determine the number of zero padding bits. In one example, the payload of zero padding bits is determined according to a variation of TABLE 15 in which the dependence on $N_{LI}(r)$ is removed, or by setting $N_{LI}(r)=0$ in B(r). In another example, the payload of zero padding bits is determined according to a variation of TABLE 16 in which the dependence on $N_{LI}(r)$ is removed, or by setting $N_{LI}(r)=0$ in B(r).

In another embodiment, the number of zero padding bits for WB CSI reporting is determined based on the possible payload values for CQI and LI that can be reported. If any of CQI or LI is not reported (or configured not to be reported), then it is not considered to determine the number of zero padding bits. In one example, the payload of zero padding bits is determined according to a variation of TABLE 15 in which the dependence on $N_{PMI}(r)$ is removed, or by setting $N_{PMI}(r)=0$ in B(r). In another example, the payload of zero padding bits is determined according to a variation of TABLE 16 in which the dependence on $N_{PMI}(r)$ is removed, or by setting $N_{PMI}(r)=0$ in B(r).

In another embodiment, the number of zero padding bits for WB CSI reporting is determined based on the possible payload values for PMI only. In one example, the payload of zero padding bits is determined according to a variation of TABLE 15 in which the dependence on $N_{CQI}(r)$ and $N_{LI}(r)$ is removed, or by setting $N_{CQI}(r)=N_{LI}(r)=0$ in B(r). In another example, the payload of zero padding bits is determined according to a variation of TABLE 16 in which the dependence on $N_{CQI}(r)$ and $N_{LI}(r)$ is removed, or by setting $N_{CQI}(r)=N_{LI}(r)=0$ in B(r).

In another scheme, the number of zero padding bits for WB CSI reporting is determined based on the possible payload values for CQI only. In one example, the payload of zero padding bits is determined according to a variation of TABLE 15 in which the dependence on $N_{PMI}(r)$ and $N_{LI}(r)$ is removed, or by setting $N_{PMI}(r)=N_{LI}(r)=0$ in B(r). In another example, the payload of zero padding bits is determined according to a variation of TABLE 16 in which the dependence on $N_{PMI}(r)$ and $N_{LI}(r)$ is removed, or by setting $N_{PMI}(r)=N_{LI}(r)=0$ in B(r).

In another embodiment, the number of zero padding bits for WB CSI reporting is determined based on the possible payload values for LI only. In one example, the payload of zero padding bits is determined according to a variation of TABLE 15 in which the dependence on $N_{CQI}(r)$ and $N_{PMI}(r)$ is removed, or by setting $N_{CQI}(r)=N_{PMI}(r)=0$ in B(r). In another example, the payload of zero padding bits is determined according to a variation of TABLE 16 in which the dependence on $N_{CQI}(r)$ and $N_{PMI}(r)$ is removed, or by setting $N_{CQI}(r)=N_{PMI}(r)=0$ in B(r).

In one embodiment 7, the number of zero padding bits is also determined considering the PUCCH format that carries the WB CSI, for example, PUCCH format 2, 3, or 4. For example, it is determined considering the minimum of the following two numbers: the maximum budget (or maximum number) for the CSI bits that can be carried (reported) via the configured PUCCH format; and the N value determined according to at least one embodiment of the present disclosure.

To enable digital precoding, efficient design of CSI-RS is a crucial factor. For this reason, three types of CSI reporting mechanism corresponding to three types of CSI-RS measurement behavior are supported in LTE specification) "CLASS A" CSI reporting which corresponds to non-precoded CSI-RS, 2) "CLASS B" reporting with K=1 CSI-RS resource which corresponds to UE-specific beamformed CSI-RS, 3) "CLASS B" reporting with K>1 CSI-RS resources which corresponds to cell-specific beamformed CSI-RS. For non-precoded (NP) CSI-RS, a cell-specific one-to-one mapping between CSI-RS port and TXRU is utilized.

Here, different CSI-RS ports have the same wide beam width and direction and hence generally cell wide coverage. For beamformed CSI-RS, beamforming operation, either cell-specific or UE-specific, is applied on a non-zero-power (NZP) CSI-RS resource (including multiple ports). Here, (at least at a given time/frequency) CSI-RS ports have narrow beam widths and hence not cell wide coverage, and (at least from the gNB perspective) at least some CSI-RS port-resource combinations have different beam directions.

In one embodiment, where DL long-term channel statistics can be measured through UL signals at a serving eNodeB, UE-specific BF CSI-RS can be readily used. This is typically feasible when UL-DL duplex distance is sufficiently small. When this condition does not hold, however, some UE feedback is necessary for the eNodeB to obtain an estimate of DL long-term channel statistics (or any of representation thereof). To facilitate such a procedure, a first BF CSI-RS transmitted with periodicity T1 (ms) and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

Using the large bandwidths available at the millimeter wave frequencies for communication systems is one of the options to combat the exponential rise in the demand of data traffic. Several research activities in this direction have already been made. There are several challenges with the millimeter wave frequencies however. Out of them, the main challenge is the large path loss. Beam-forming using large antenna array is a potential solution to counter the path loss problem. This is possible because due to small wavelengths associated with the millimeter wave frequencies, high-gain antenna arrays with small form factors can be obtained.

The communication systems such as LTE-Advanced and IEEE 802.11ac use beam-forming in digital domain. However, digital beam-forming for the millimeter wave communication system is not practical due to costly and power consuming hardware requirements. To circumvent this, beam-forming in RF domain is used in 60 GHz wireless LAN IEEE 802.11ad. However, the use of only RF beam-forming restricts the resource allocation across users. An intermediate practical solution is a hybrid beam-forming (HBF) structure which combines both RF and digital beam-forming.

Figure 12:
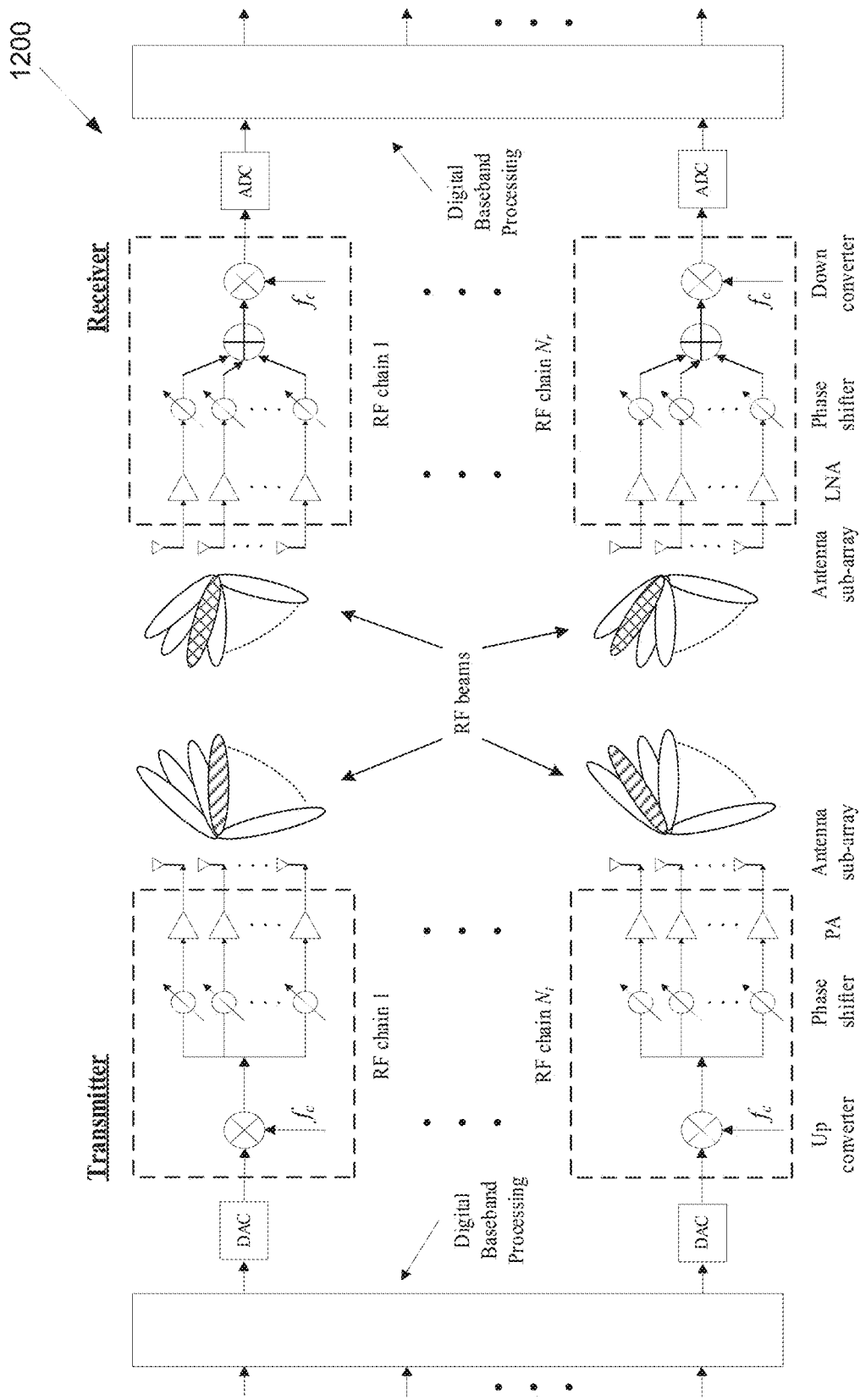
FIG. 12 illustrates an example communication system with HBF according to embodiments of the present disclosure.

FIG. 12 illustrates an example communication system with HBF 1200 according to embodiments of the present disclosure. The embodiment of the communication system with HBF 1200 illustrated in FIG. 12 is for illustration only. FIG. 12 does not limit the scope of this disclosure to any particular implementation.

In a communication system with HBF, the transmitter's (TX) antenna array is partitioned into sub-arrays. Antennae in each sub-array are connected to an RF chain that includes RF components such as phase shifters, power amplifiers (PA), and an up-converter. RF chains are preceded by a digital baseband processing unit. The RF and digital parts are connected through a digital to analog converter (DAC). The receiver (RX) has a similar structure in which antennae of each sub-array are connected to an RF chain that has phase shifters, low noise amplifiers (LNA), and a down-converter. Each RF chain is connected to the digital baseband unit through an analog to digital converter (ADC). An example of a communication system with HBF is shown in FIG. 12.

There are $N_t$ RF chains at the TX, where each RF chain is connected to $N_t^{RF}$ antennae. It denotes the beam-forming vector (phase values) of the $i^{th}$ RF chain as $w_i$. The beam-forming matrix of all RF chains together at the TX is denoted as W. Similarly, at the RX, there are $N_r$ RF chains, each of which is connected to $N_r^{RF}$ antennae. Beam-forming vector of the $i^{th}$ RF chain at the RX is written as $v_i$. The overall beam-forming matrix for all RF chains together at the RX is given by V.

Each RF chain at the TX and at the RX can form different RF beams depending on an antenna configuration and the phase values of phase shifters. For instance, if the antenna spacing is one half of the wavelength of the carrier frequencies (for example millimeter wave frequencies) and the phase values are progressive (the difference between the phase values of two adjacent antennae remains constant for any two adjacent antennae), then the resultant RF beam has one main lobe with the width inversely proportional to the number of antennae connected to the RF chain.

Figure 13:
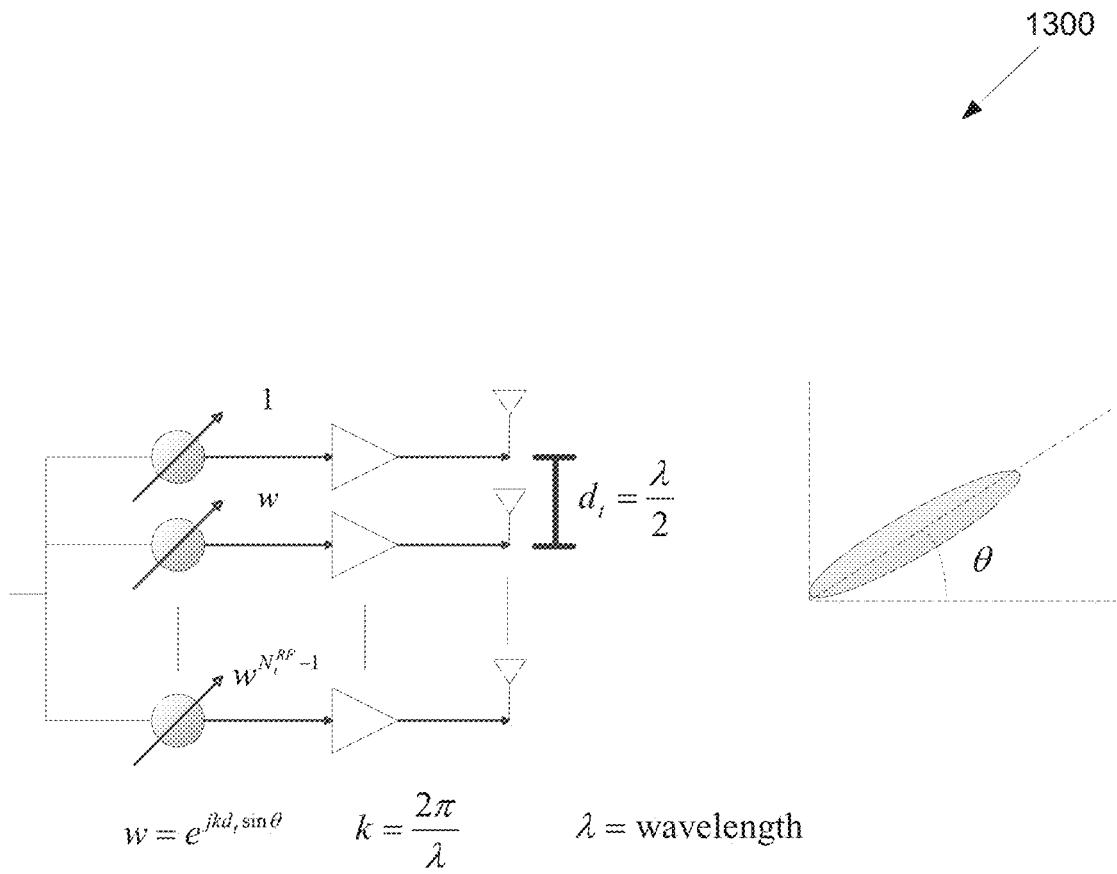
FIG. 13 illustrates an example RF beam formation using an RF chain at the transmitter according to embodiments of the present disclosure.

FIG. 13 illustrates an example RF beam formation 1300 using an RF chain at the transmitter according to embodiments of the present disclosure. The embodiment of the RF beam formation 1300 illustrated in FIG. 13 is for illustration only. FIG. 13 does not limit the scope of this disclosure to any particular implementation.

FIG. 13 depicts an example of RF beam formation using an RF chain at the TX. In the rest of the present disclosure, it may be assumes that both the antenna spacing in each sub-array and the spacing between the last antenna of a sub-array and the first antenna of the next sub-array are one half of the wavelength of the carrier frequencies (for example millimeter wave frequencies), and the phase values of all sub-arrays are progressive, unless otherwise stated.

Figure 14:
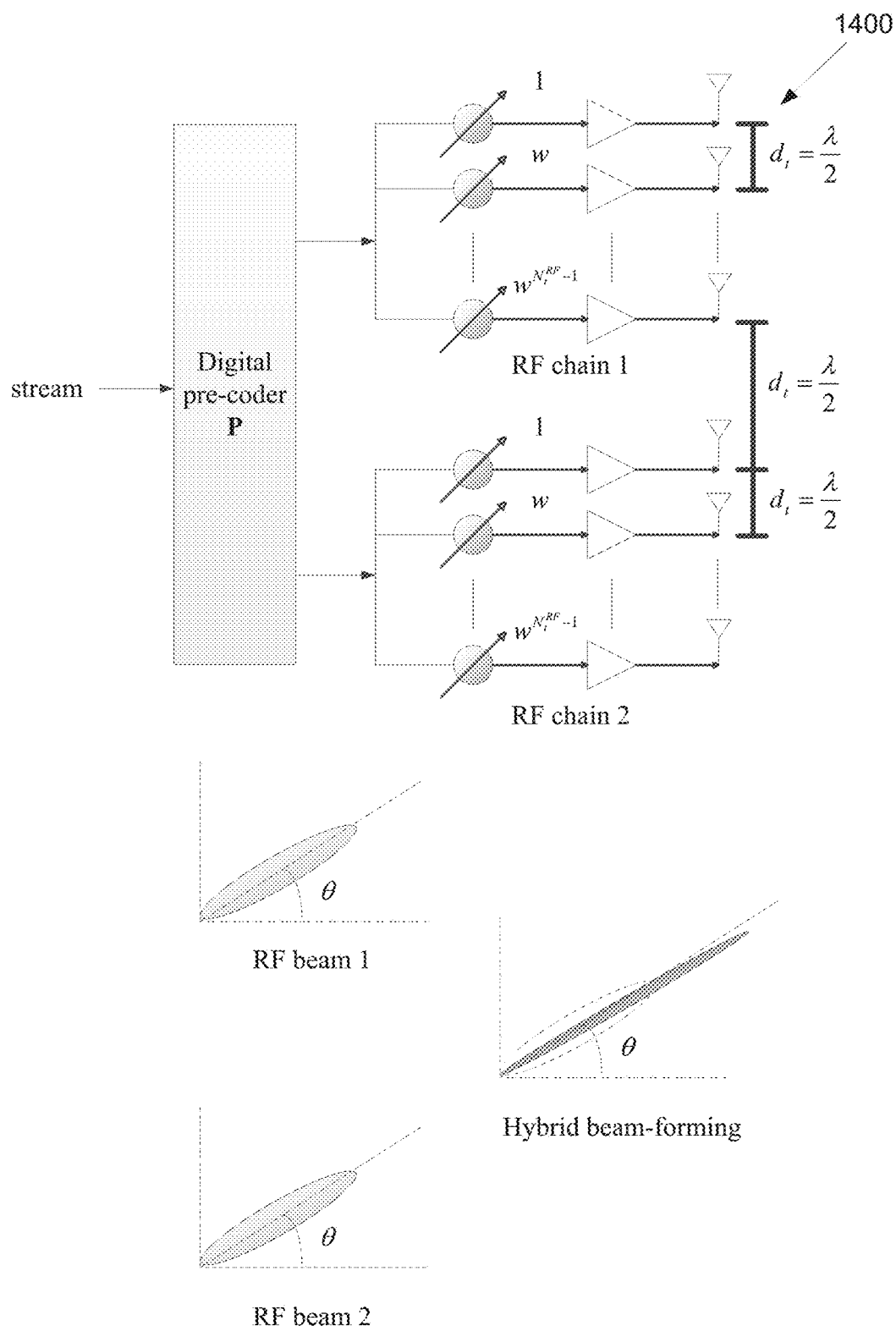
FIG. 14 illustrates an example hybrid beam-forming at the transmitter according to embodiments of the present disclosure.

FIG. 14 illustrates an example hybrid beam-forming 1400 at the transmitter according to embodiments of the present disclosure. The embodiment of the hybrid beam-forming 1400 illustrated in FIG. 14 is for illustration only. FIG. 14 does not limit the scope of this disclosure to any particular implementation.

The digital baseband processing unit at the TX includes a digital pre-coder P which combines different RF beams and creates a hybrid beam. The shape of the hybrid beam depends on different RF beams that are combined, the spatial separation between different sub-arrays, and the output of the digital pre-coder. An example of hybrid beam-forming using two RF chains at the TX is shown in FIG. 14.

The hybrid beam-forming at the RX is similar to that at the TX. The digital baseband unit at the RX has a digital combiner U which creates a hybrid beam together with different RX RF beams.

In order to transmit data from the TX to the RX, it may be needed to obtain the optimal hybrid beam-forming solution (RF phase values and digital pre-coder/combiner) using the instantaneous channel knowledge. The optimal hybrid beam-forming solution requires a joint optimization over all choices of RF and digital beam-formers. The complexity of this joint optimization is prohibitive in practice. To reduce complexity, an alternate separation-based suboptimal approach is to first find the RF beam-formers (V and W) and then use them to obtain the digital beam-formers (P and U). In the present disclosure, this separation-based approach and focus on the RF beam-forming part are adopted. In particular, it is interested in finding the optimal RF beam-formers assuming that the optimal RF beam-formers are chosen from a codebook both at the TX and at the RX. Let $C_t$ and $C_r$ be the RF codebooks containing RF beam-forming vectors used at the TX and at the RX, respectively.

Figure 15:
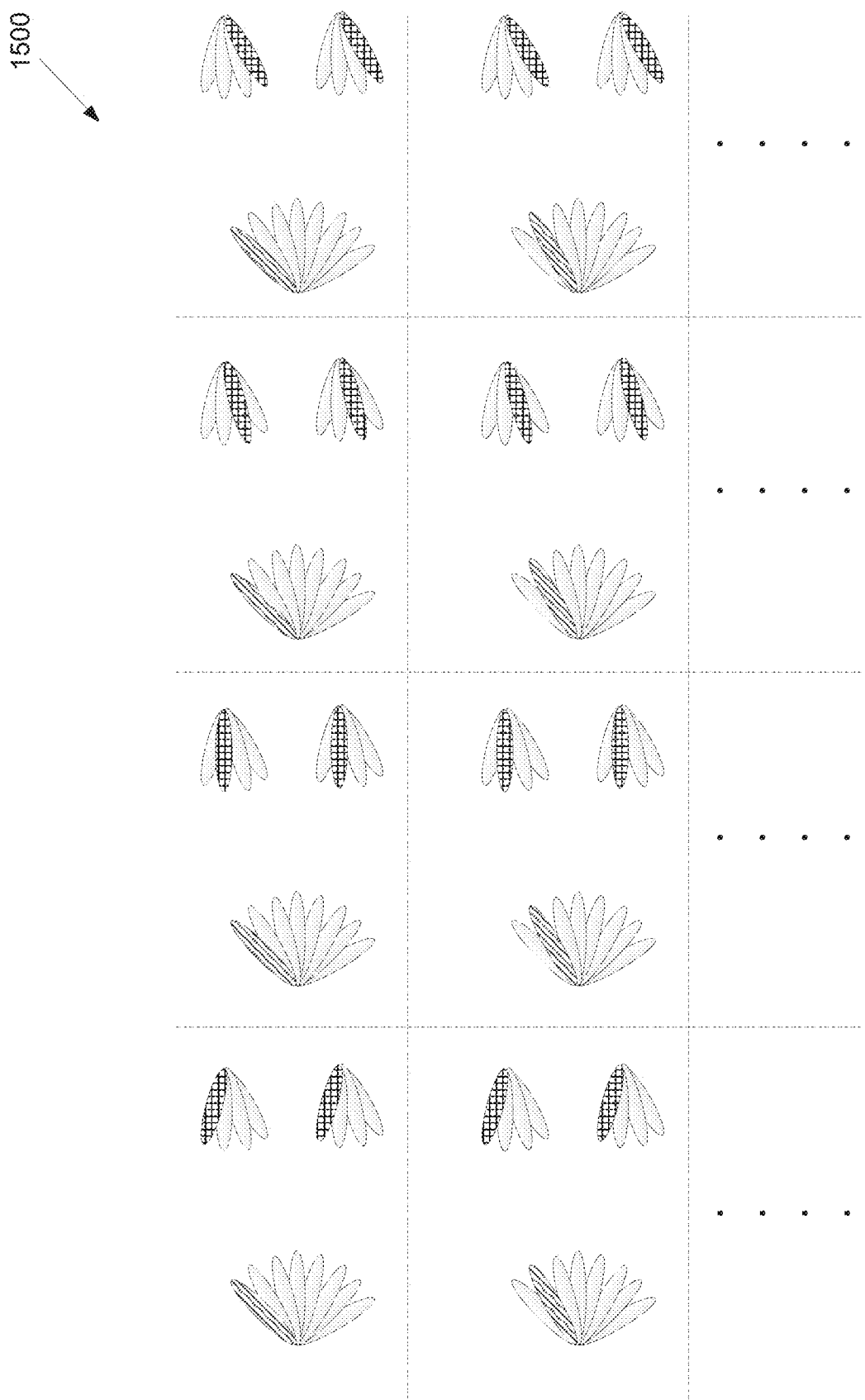
FIG. 15 illustrates an example systematic pilot transmission from 1 TX RF chain to 2 RX RF chains according to embodiments of the present disclosure.

FIG. 15 illustrates an example systematic pilot transmission 1500 from 1 TX RF chain to 2 RX RF chains according to embodiments of the present disclosure. The embodiment of the systematic pilot transmission 1500 illustrated in FIG. 15 is for illustration only. FIG. 15 does not limit the scope of this disclosure to any particular implementation.

The practical way to obtain the optimal RF beam-formers is that the TX sends pilots using all RF beams at all RF chains, and the RX receives these pilot measurements using all RF beams at all RF chains. The RX then uses all these measurements to obtain the "best" RF beams from the RF codebooks for all TX/RX RF chains. The RX finally communicates this solution to the TX. FIG. 15 shows an example of systematic pilot transmission from 1 TX RF chain to 2 RX RF chains.

The choice of "best" RF beams at TX/RX RF chains depends on the channel between TX and RX, which changes depending on TX/RX mobility, location (indoor/outdoor), atmosphere, etc. The faster any of these changes, the faster the channel changes, and hence the "best" RF beams at TX/RX RF chains may be needed to be updated at a faster rate. Therefore, to keep track of the "best" RF beams, it may be needed to repeat the pilot transmission procedure frequently. Note that the number of pilot transmissions for each TX/RX RF chain pair is $|C_t| \times |C_r|$, where $|C_t|$ denotes the size of the TX RF codebook $C_t$. Since all RX RF chains can beam-form simultaneously, the total number of pilot transmissions for all TX/RX RF chain pairs is $N_t \times |C_t| \times |C_r|$. However, TX transmitting this many pilots frequently and RX communicating the "best" RF beams back to the TX may not be possible in many communication systems.

Also, in order to obtain the "best" TX/RX RF beams at different TX/RX RF chains for data communication, the RX needs to process pilot measurements (mentioned above) for different TX/RX RF beam combinations, and then select the "best" combination based on some performance metric such as the channel capacity, the SINR, etc. However, the number of possible RF beam combinations is $(|C_t|)^{N_t} \times (|C_r|)^{N_r}$, which is very large even for reasonable values of $N_t, N_r, |C_t|$, and $|C_r|$.

Figure 16:
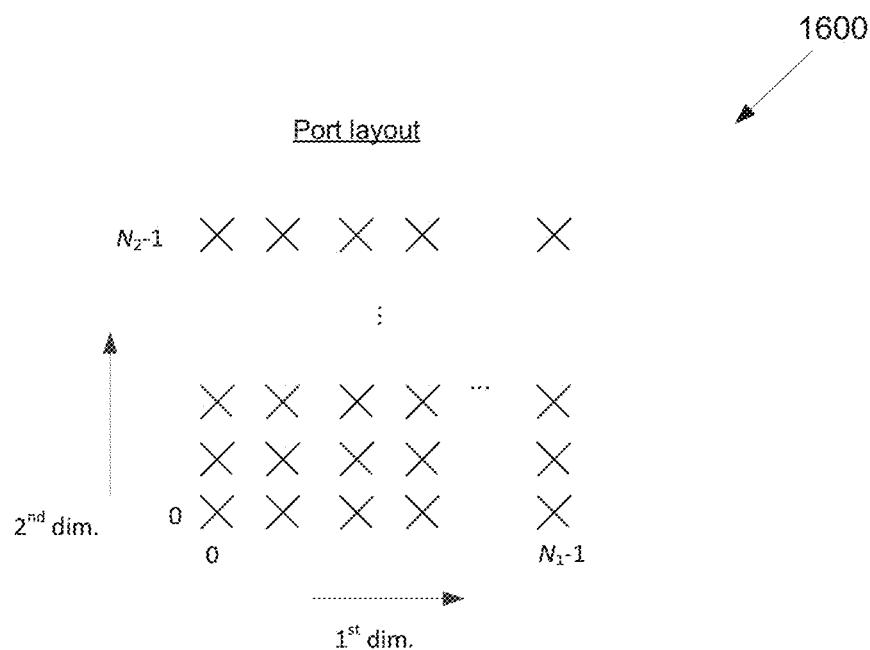
FIG. 16 illustrates an example antenna port layout per antenna panel according to embodiments of the present disclosure.

FIG. 16 illustrates an example antenna port layout per antenna panel 1600 according to embodiments of the present disclosure. The embodiment of the antenna port layout per antenna panel 1600 illustrated in FIG. 16 is for illustration only. FIG. 16 does not limit the scope of this disclosure to any particular implementation.

In the following, it may be assumed that $N_1$ and $N_2$ are the number of antenna ports with the same polarization in the first and second dimensions, respectively of an antenna panel of gNB or/and UE, where gNB or/and UE can have multiple antenna panels. For 2D antenna port layouts, it may have $N_1>1$, $N_2>1$, and for 1D antenna port layouts $N_1>1$ and $N_2=1$. So, for a dual-polarized antenna port layout, the total number of antenna ports is $2N_1N_2$. An illustration is shown in FIG. 16.

In the present disclosure, the term "beam" mathematically refers to a vector of appropriate length whose elements are applied to antenna elements or antenna ports to steer (or precode or beamform) the transmission (or reception) of wireless signal(s) in a particular direction. In case of two-dimensional (2D) antenna layouts, the vector can be a Kronecker of two vectors, one for each dimension. For example, a 2D vector $W_{l,m}$, can be given by:

$$W_{l,m} = V_l \otimes U_m = [v_0 U_m \; v_1 U_m \; \ldots \; v_{N_1-1} U_m]^T$$

$$U_m = [u_0 \; u_1 \; \ldots \; u_{N_2-1}]$$

$$V_l = [v_0 \; v_1 \; \ldots \; v_{N_2-1}]$$

where $N_1$ and $N_2$ are number of antenna elements (or ports) in the $1^{st}$ and $2^{nd}$ dimension, respectively.

Figure 17:
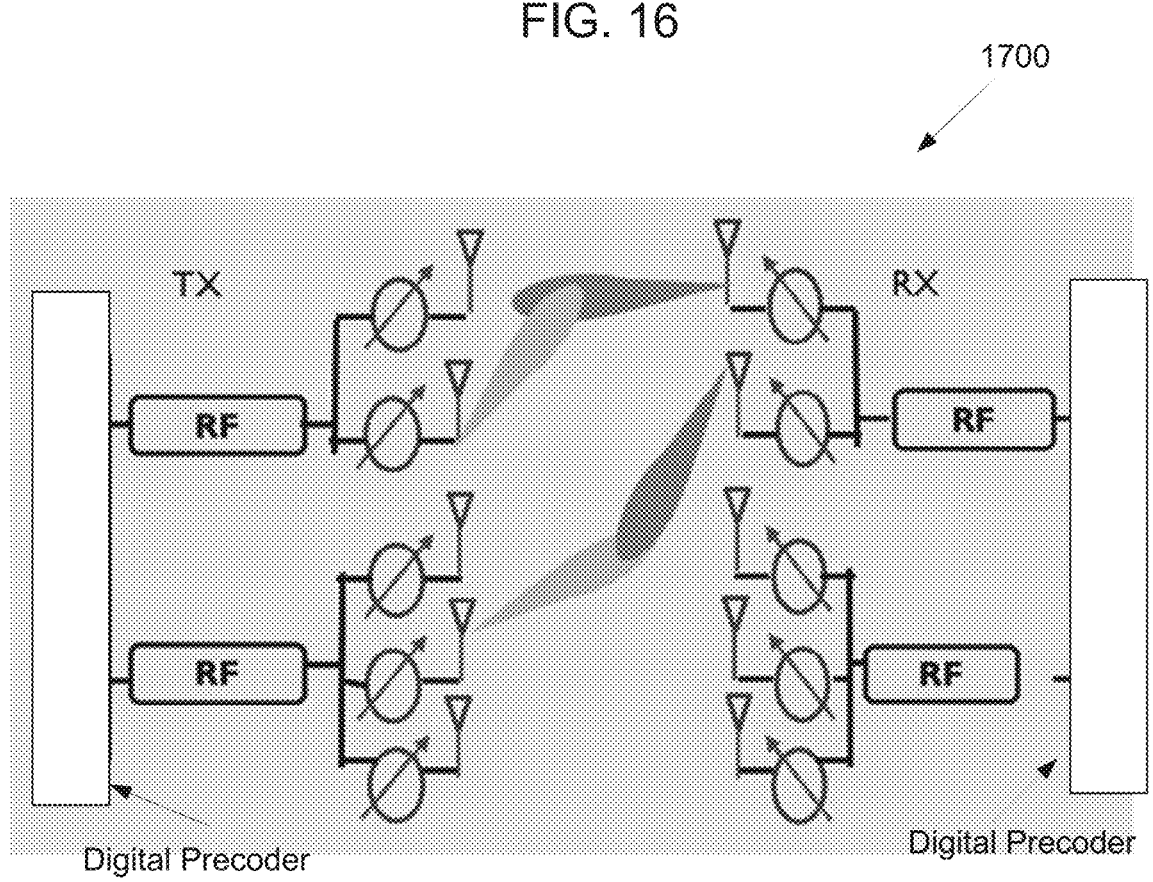
FIG. 17 illustrates an example mmWave hybrid beam-forming architecture according to embodiments of the present disclosure.

FIG. 17 illustrates an example mmWave hybrid beamforming architecture 1700 according to embodiments of the present disclosure. The embodiment of the mmWave hybrid beamforming architecture 1700 illustrated in FIG. 17 is for illustration only. FIG. 17 does not limit the scope of this disclosure to any particular implementation.

The TX and RX analog or radio frequency (RF) beam search in millimeter wave (mmWave) systems involves huge overheads due to the exhaustive manner of beam sweeping at each TX or RX RF chain, where all RF components of an RF chain is connected/corrected by a single antenna port. It may be assumed to have a hybrid beamforming architecture as shown in FIG. 17, and $N_{TX}$ RF chains at gNB (with $B_{TX}$ RF beam candidates at each RF chain) and $N_{RX}$ RF chains at UE (with $B_{RX}$ beam candidates at each RF chain) may be obtained. Due to the existence of the hybrid beamforming architecture, it may be enabled to perform a beam sweeping at each of the RF chain at both the gNB and UE and the complexity of the exhaustive beam search grows exponentially with the number of beams, i.e., $O(N_{TX}^{B_{TX}} N_{RX}^{B_{RX}})$. This complexity can be very large and intolerable in the next generation communications with the requirements such as for ultra-low latency. In order to reduce the complexity, a greedy algorithm which reduces the complexity to scale linearly with the number of beams at each RF chain is provided next.

The algorithm starts with initializing beams at each TX/RX RF chain (from the candidate TX/RX RF beams). This initialization can be randomly or based on a fixed initialization method. There are in total of $N_{iter}$ iterations inside the greedy algorithm. In each of the greedy iteration, each RF chain at the gNB and UE could be one by one. At each RF chain, it may be further looped through all possible options among the $B_{TX}$ (or $B_{RX}$) beams, while fixing the beam at the other RF chains. A performance metric (e.g. the determinant of the outer product matrix K, where $K=HH^*$ or $H^*H$ and H is a baseband channel matrix for a given choice of beams at TX/RX RF chains) achieved by each beam option is evaluated, and the final beam at the current RF chain may herein be selected as the one with the largest performance metric.

After looping through all gNB RF chains, the same procedure at the UE side may be replicated. After each iteration, beams at each RF chain of gNB and UE are updated. And the algorithm continues within the next iteration starting with the updated beams from the result of the last greedy algorithm iteration. The algorithm can be summarized as below. Let's first denote the analog beam (beam indices at all RF chains) selected at the gNB and at the UE respectively as $w_{TX}$ and $w_{RX}$, respectively. Let $H(w_{TX}, w_{RX})$ be the baseband channel for a given (TX,RX) beam indices $(w_{TX}, w_{RX})$. Let us use the notation $w_{TX}(p)$ to indicate the p-th element (or entry) of $w_{TX}$. Let $N_0$ be the noise variance.

TABLE 17

Initialize n = 0, $N_{iter}$ = total number of greedy iterations, $T_m$ = −1,
   $T_{max}$ = 0
Initialize $w_{TX}$ as a vecotr of length $N_{TX}$, each entry is initialized as an
   integer from 1 to $B_{TX}$.
Initialize $w_{RX}$ as a vecotr of length $N_{RX}$, each entry is initialized as an
   integer from 1 to $B_{RX}$.
while (n < N)
  if ($T_m < T_{max}$)
    $T_{max} = T_m$
    n ← n + 1
    for p = 1 to $N_{TX}$
      T = [ ]
      for b = 1 to $B_{TX}$
        $w_{TX}(p)$ = b $$T = \left[T, \log_2\left(1 + \frac{H(w_{TX}, w_{RX})H(w_{TX}, w_{RX})^H}{N_0}\right)\right]$$

End for
      Find the index of the maximum value $\bar{b}$ in T, [~, $\bar{b}$] = max(T)
      $w_{TX}(p) = \bar{b}$
    End for
    for p from 1 to $N_{RX}$
      T = [ ]
      for b from 1 to $B_{RX}$
        $w_{RX}(p)$ = b $$T = \left[T, \log_2\left(1 + \frac{H(w_{TX}, w_{RX})H(w_{TX}, w_{RX})^H}{N_0}\right)\right]$$

End for
      Find the index of the maximum value $\bar{b}$ in T, [~, $\bar{b}$] = max(T)
      $w_{RX}(p) = \bar{b}$
    End for $$T_m = \log_2\left(1 + \frac{H(w_{TX}, w_{RX})H(w_{TX}, w_{RX})^H}{N_0}\right)$$

else
    break;
  End if
End while
Solution: $w_{TX}$, $w_{RX}$

The complexity of greedy algorithm scales linearly with both the number of RF chains and the beams, and can be $O(N(N_{TX}B_{TX}+N_{RX}B_{RX}))$ in the worst case.

The user scheduling at the gNB is complicated due to hybrid beamforming, especially when the user scheduling comes to the case of multi-user (MU) scheduling. In the scheduling without beam sweeping, the task is simply to schedule the users. In the scheduling with beam sweeping, however, the scheduler needs to determine which RF chain is going to serve which user, and also which beam each RF chain needs to use. Therefore, the scheduling problem becomes a joint user and beam scheduling problem. A few examples of such schedulers are as follows.

In single-user (SU) scheduler, the answer to the joint user and beam scheduling problem is intuitive, i.e., all RF chains schedule only one user based on a SU metric such as proportional fairness (PF) metric, and the beam used at each RF chain may simply be the best beam for the user. In case of FDD systems, the best beam can be obtained from the CSI feedback from the user. In case of TDD systems, it can be obtained from the UL channel measurements at the gNB based on the UL reference signal (such as SRS) transmission from the UE.

In space division multiple access (SDMA) scheduler, a subset of RF chains at the gNB are scheduled to different users without any RF chain sharing. In this case, each RF chain may use the best beam of the current user that is scheduled. The information about beams for the scheduled RF chains to a user is obtained via CSI feedback (FDD systems) or UL channel measurement (TDD systems).

In the case of MU scheduler, a subset of RF chains at the gNB can be shared by multiple users. The scheduling problem. i.e., is intrinsically hard since the best beam at an RF chain serving multiple users is likely to be different for different users, and also it is not clear how much performance gain can be obtained when compared with SU or SDMA scheduler due to potentially large MU interference caused by RF chains shared among multiple users. The algorithm for the MU-MIMO scheduler is explained in TABLE 18.

TABLE 18

Input:
Set of active users $U_A$,
PF metric PF for all users, e.g., based on SU feedback
Baseband channel matrix H for all users and for all beam candidates,
User beam feedback $F_B$, e.g., based on SU feedback
Initialization:
Scheduled user set U = [ ],
Port (or TX RF chain) assignment A initialized to all zeros,
Beam Assignment B initialized to all zeros,
Precoder P = [ ],
sum rate $T_m$ = 0,
$T_{max}$ = −1
Find the user first user u1 with the largest PF, [~, $u_1$] = max(PF)
Add $u_1$ into the scheduled user set U = [U, $u_1$]
Update Port assignment A to all ones, A = [1, 1, . . . , 1],
Update beam assignment by ui's best beam B = $F_B(u_1)$,
Calculate precoder P based on the baseband channel matrix, i.e., H(B)
Update sum rate $T_m$ to the rate achieved based on the calculated precoder P and baseband
channel matrix H(B)
for i = 1 to the total number of the users
   while ($T_{max} < T_m$)
   $T_{max} = T_m$
   $T_s$ = [ ]
   $U_t$ ← U
   for u in the $U_A$\U, i.e., the difference set of active users $U_A$ and scheduled user set U
     $U_t$ ← $U_t$ ∪ u
     Update Port assignment by function A = $g_p(U_t)$
     Update beam assignment by function B = $g_s(U_t)$
     Calculate precoder by P = $g_p(U_t, A)$
     Update sum rate by $t_i$ = $g_T(U_t, P)$
     $T_s$ = [$T_s$, $t_i$]
   End for
   Find the user m with the largest sum rate [~, m] = max($T_s$)
   Update $U_s$ ← $U_A$\U
   U ← U ∪ $U_s$(m)
   A = $g_p(U_t)$
   B = $g_s(U_t)$
   P = $g_p(U_t, A)$
   $T_m$ = $g_T(U, P)$
End for Each of these function $g_p$, $g_s$, $g_p$, $g_T$ vary with different schedulers and may be explained later.

In order to determine how user scheduling, beam assignment and the RF chain sharing are performed, a few example MU scheduling solutions are provided as follows.

Figure 18:
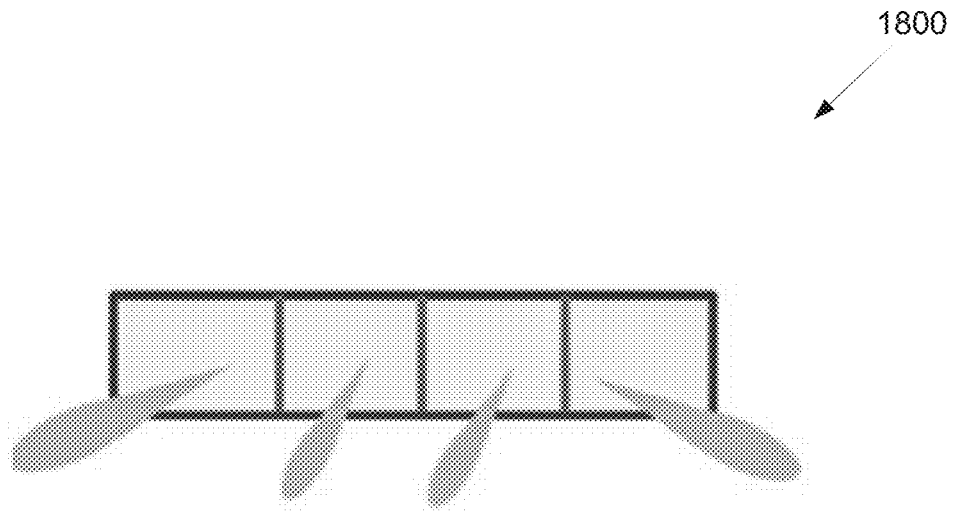
FIG. 18 illustrates an example beam assignment of the first user according to embodiments of the present disclosure.

FIG. 18 illustrates an example beam assignment of the first user 1800 according to embodiments of the present disclosure. The embodiment of the beam assignment of the first user 1800 illustrated in FIG. 18 is for illustration only. FIG. 18 does not limit the scope of this disclosure to any particular implementation.

It may be assumed to have in total of $N_{TX}$ RF chains at the gNB. The first user is scheduled based on the maximum PF metric. The beams at each port are updated as the beam feedback from the first user, an example is illustrated by the pink beams in FIG. 18. A MU-MIMO scheme is designed where a subset (e.g. only partial or full) RF chains are used for MU-MIMO, while the remaining RF chains still serve only one single user scheduled based on PF. The MU RF chains are selected if and only if the beam currently assigned at the RF chain is identical to the best beam of the newly scheduled user at the RF chain. For MU interference suppression, one of the following embodiments can be used.

In one embodiment 8, additional constraints such as the least number of MU RF chains (that have the same beam for the two users) that is fixed to a value, e.g. 2 m is considered.

In one embodiment 9, the maximum number of MU users scheduled can be restricted to the minimum of the number of MU ports and a fixed value (e.g. 2).

In one embodiment 10, the maximum number of MU users can be up to the maximum number of RF chains among which all MU users have identical beams. This exploits the full MU potential, but the MU interference might be too large.

Figure 19:
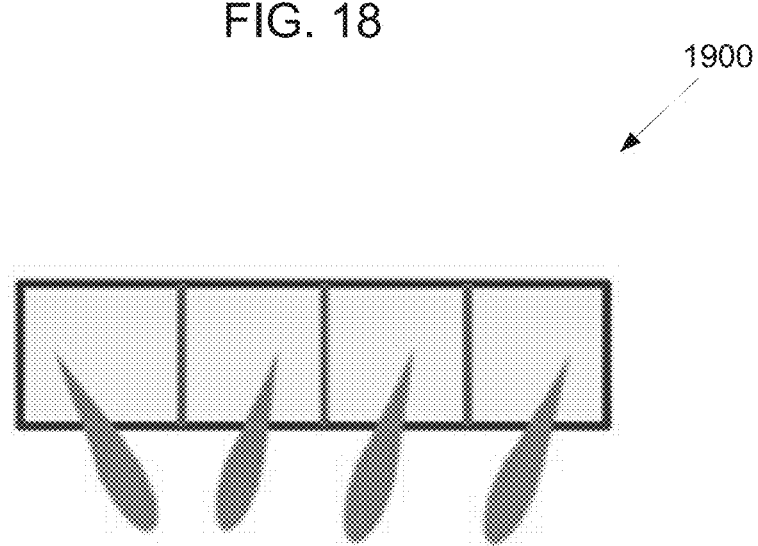
FIG. 19 illustrates an example optimal beam of the second user to be scheduled according to embodiments of the present disclosure.

FIG. 19 illustrates an example optimal beam of the second user 1900 to be scheduled according to embodiments of the present disclosure. The embodiment of the optimal beam of the second user 1900 illustrated in FIG. 19 is for illustration only. FIG. 19 does not limit the scope of this disclosure to any particular implementation.

For example, based on the beam assignment of user 1 and user 2 as illustrated in FIG. 18 and FIG. 19, respectively, the beams at the second and the third RF chain are identical for two users. Therefore, these two ports are selected as the MU RF chains and users share the RF chains and MU interference is properly modeled herein. Therefore, the first MU-MIMO scheduler does not change the beam assignment at the different RF chains; instead, it keeps the beam at each RF chain as the original beams assigned to the first user scheduled by PF.

In the second MU-MIMO scheduler, it may not explicitly set a constraint over the MU ports selection (identical beams for different users). Here, a naive solution that all RF chains are assumed to be shared among multiple users is considered, without extra constraints over the beams. In this case, it is not very clear which beams may be assigned at each of the RF chain since the beams of the users (two users) might be different from the feedback. The provided solution is also quite simple. The provided solution iterates over each RF chain, and if the beams are not identical for two users, then select the beam which gives the largest sum-rate, while keeping the beams at other RF chains fixed. Therefore, in the current MU-MIMO setting, the beams at each RF chain might keep changing based on the user scheduled and the RF chains occupied by each user.

MU-MIMO1 employs partial RF chains to implement MU-MIMO while keeping the rest of the RF chains serving single user. MU-MIMO2 employs all ports for MU-MIMO which might cause severe interference among users, even if interference cancellation digital precoding is applied, since the beams are highly directional. In order to further exploit the gain of the MU-MIMO while suppressing the MU interference at the same time, a hybrid scheduling scheme combining MU-MIMO and SDMA is provided. In brief, the gNB partitions RF chains into two sets, respectively for MU users and SDMA users. MU scheduling and SDMA scheduling are further done independently at the MU and SDMA RF chains.

In one embodiment 11, compared to MU-MIMO1, the constraint of MU RF chain selection from same beam to same (or close) beams is relaxed. It may have the constraints over the beams of the two users sharing the same port in order to exploit the effects of the interference cancellation by digital precoding. The same (or close) beam is defined as follows.

Assuming a total of $N=B_{TX}$ analog beams defined as $\mathcal{B}=\{b_1, b_2, \ldots b_N\}$ at the gNB, and the corresponding analog antenna weights of each beam are represented by $\mathcal{F}=\{f_1, f_2, \ldots, f_N\}$. Stacking antenna weights of all analog beams together, the full analog weight matrix is obtained as $\bar{\mathcal{F}}=[f_1, f_2, \ldots f_N]$. In order to capture the fact if any two beams are close, the correlation factor between two antenna weights is calculated. In particular, the covariance matrix $C=\bar{\mathcal{F}}^H\bar{\mathcal{F}}$ is obtained, where each entry of C, e.g., $C_{ij}$ is evaluated by the correlation of $f_i$ and $f_j$, i.e., $C_{ij}=f_i^H f_j$. It may further threshold the correlation matrix by the correlation threshold $\eta$, and obtain the close beam bitmap matrix $\Theta$, by $$\Theta_{ij} = \begin{cases} 1, & C_{ij} \geq \eta \\ 0, & C_{ij} > \eta \end{cases},$$
$$i, j = \{1, 2, \ldots, N\}.$$

An example of threshold $\eta$ is threshold $\eta=0.5$. With the close beam bitmap $\Theta$ available, inside each scheduler, suppose the beam of the first user scheduled is $\bar{w}=[\bar{w}_1, \bar{w}_2, \bar{w}_3, \bar{w}_4]$ (here the example of the case is considered when the total number of gNB RF chains is 4 for illustration only). And the best beams of the second (potential) scheduled user are denoted by $w=[w_1, w_2, w_3, w_4]$. In the first phase, the correlation bitmap matrix $\Theta$ of the corresponding beam pair at each of the RF chain is checked, and the indicator of each RF chain if the two beams are close by $d=[\Theta_{\bar{w}_1 w_1}, \Theta_{\bar{w}_2 w_2}, \Theta_{\bar{w}_3 w_3}, \Theta_{\bar{w}_4 w_4}]$ is obtained Then, the MU RF chain set $\mathcal{M}=\{i: d_i=1\}$ and the SDMA RF chain set as $\mathcal{P}=\{i: d_i=0\}$ are split.

In one embodiment 12, instead of only restricting the MU RF chains have same (or close) beams among MU users, in this embodiment, it may be imposed that further constraints in obtain the MU RF chains $\mathcal{M}$, after calculating the bitmap vector $d=[\Theta_{\bar{w}_1 w_1}, \Theta_{\bar{w}_2 w_2}, \Theta_{\bar{w}_3 w_3}, \Theta_{\bar{w}_4 w_4}]$. The beam pairs of the MU RF chain set $\mathcal{B}_{MU}=\{[\bar{w}_i, w_i], i \text{ in } \mathcal{M}\}$ are selected, and further take out the RF chains in $\mathcal{M}$, with same (or close) beam, in order to further exploit digital precoding gain. In particular, there are three ways of further filtering MU RF ports from $\mathcal{M}$ as follows.

In one embodiment 13, the bitmap indicator $d_{MU}=[\Theta_{w_i w_j}, i,j \in \mathcal{M}]$ is calculated If for any beam of the first scheduled user among two MU RF chains is identical, i.e., $\Theta_{w_i w_j}=1$, then the MU RF chains remain. Otherwise, there is no MU RF chains, i.e., $\mathcal{M}=[\ ]$ is empty.

In one embodiment 14, the bitmap indicator $d_{MU}=[\Theta_{w_i w_j}, i,j \in \mathcal{M}]$, $d'_{MU}=[\Theta_{\bar{w}_i w_j}, i,j \in \mathcal{M}]$ is calculated. If for any beam of both the first scheduled user and the second user among two MU RF chains is identical, i.e., $\Theta_{w_i w_j}=1$, $\Theta_{\bar{w}_i w_j}=1, \wedge i,j \in \mathcal{M}$, then the MU RF chains remain. Otherwise, there is no MU RF chains, i.e., $\mathcal{M}=[\ ]$ is empty.

In one embodiment 15, the bitmap indicator $\bar{d}_{MU}=[\Theta_{w_i w_j}+\Theta_{\bar{w}_i w_j}, i,j \in \mathcal{M}]$ is calculated. If for any beam of either the first scheduled user and the second user among two MU RF chains is identical, i.e., $\Theta_{w_i w_j}+\Theta_{\bar{w}_i w_j} \geq 1, \wedge i,j \in \mathcal{M}$, then the MU RF chains remain. Otherwise, there is no MU RF chains, i.e., $M=[\ ]$ is empty.

Among the MU RF chains $\mathcal{M}$, MU-MIMO scheduling may be implemented. Similar as the MU-MIMO2, the beams at the MU RF chains for two users might be different, in which case the gNB is going to calculate the sum-rate achieved by the candidate beam and decide the best beam at each RF chain. For the remaining SDMA RF chains $\mathcal{P}$, the SDMA RF chains may be partitioned to different users, and beams simply be updated based on the beam of the user occupying the certain RF chain.

After MU-MIMO and SDMA scheduling are respectively done over the RF chain set, precoders (e.g. SLNR and eigen-precoding for MU-MIMO and SDMA respectively) are calculated correspondingly. Precoders need to be properly normalized and stacked together for each different user. Assume the users scheduled for the MU-MIMO are $U_{MU}$ and scheduled for SDMA are $U_{SDMA}$, and the precoder set for users $U_{MU}$ are $P_{MU}=[P_1, P_2, \ldots, P_{N_{MU}}]$, and precoder set for SDMA users $U_{SDMA}$ are $Q_{SDMA}=[Q_1, Q_2, \ldots, Q_{N_{SDMA}}]$ (SDMA precoders for different users might have different lengths since the RF chains are partitioned to users without any size constraint). It may be noted that up to now all $P_i, 1 \leq i \leq N_{MU}$ and $Q_i, 1 \leq i \leq N_{SDMA}$ of norm 1.

To further implement normalization across MU and SDMA users, it may be normalized that the current norm-1 precoder by the fraction of number of RF chains it occupies for the current user over the total number of RF chains of all MU and SDMA users $N_P = \sum_{i=1}^{N_{MU}} \text{len}(P_i) + \sum_{j=1}^{N_{SDMA}} \text{len}(Q_j)$, where len(•) represents the length of the precoder (•), i.e., the number of RF chains occupied for the user. Specifically, each precoder is further normalized by $$P'_i = P_i * \sqrt{\frac{\text{len}(P_i)}{N_P}}, \text{ and}$$

$$Q'_i = Q_i * \sqrt{\frac{\text{len}(Q_i)}{N_P}}.$$

After each precoder is obtained and properly normalized per user, precoders for MU and SDMA users need to be aligned and stacked together by combining MU and SDMA users.

The total scheduled user set is $U_S = U_{MU} \cup U_{SDMA}$, and scheduled user could be SDMA only, or MU only, or both SDMA and MU users. Therefore, listing out all users that are scheduled $u \in U_s$, the precoder $P_f$ for the current user (initialized by all zeros) can be updated by $P_f(\mathcal{M}) = P_{u_{MU}}$ and $P_f(\wp) = Q_{U_{SDMA}}$, where $u_{MU}$ and $u_{SDMA}$ are respectively the user index in the MU user set $U_{MU}$ and $U_{SDMA}$ of the current user u, respectively.

In the next step, SDMA and MU RF chains can be considered together to obtain the updated MU interference and also the precoder. After user and beam scheduling, precoder and SINR can again be calculated for each subband.

In addition to the overheads of beam sweeping discussed in Component 1, the overhead and signaling in the beam information feedback can also be large and unmanageable in mmWave hybrid precoding architecture. Theoretically, the total number of feedbacks (if all feedbacks are sent) is identical to the number of beam sweepings, i.e., $O(N_{TX}^{B_{TX}} \cdot N_{RX}^{B_{RX}})$. This could become overwhelming and not practical in real implementations. In practice, the number of beam feedbacks is restricted, either by limitations due to the control plane overhead or by the constraints of the hardware capability of UE. If very limited number of beams are fed back to the gNB (which is most likely the case in reality), however, the MU (or SDMA) interference when multiple users are scheduled cannot be modeled explicitly in the scheduler, which makes it hard to model the MU interference while performing scheduling. MU interference, as has been discussed above, can actually be a critical problem in MU scheduling since the beams can be highly directional and users can share the same beam over the same RF chain.

Therefore, there exists some tradeoff between the beam feedback overhead and the performance of the scheduler. In the case that full beam feedback is infeasible in practice while small number of beam feedback is insufficient in modeling interference while doing scheduling, there may be some smarter ways of finding the balance point where both feedback overhead and scheduler performance are taken into consideration properly. In order to solve this problem, there may be two approaches, respectively named as network control (gNB side) and user assistance (UE side). Both of these two schemes require extra feedback from UE, but the contents of the feedback vary based on the needs.

The signaling for the additional (extra) feedback can be trigged dynamically by the gNB (e.g. using a DCI field such as CSIRequestField). Such triggering can be associated with aperiodic CSI feedback.

In the solution based on network control, it may be provided to exploit the gNB's awareness of beam assignment after the first user is scheduled based on the PF. After the first user is scheduled, the beams are updated correspondingly at each RF chains based on the feedback, denoted by $=F_B(u_1)=[b_1, b_2, b_3, b_4]$. Assume the beam feedback of the second user (for scheduling) is $B_2 = F_B(u_2) = [\bar{b}_1, \bar{b}_2, \bar{b}_3, \bar{b}_4]$. Therefore, inside each scheduling cycle, it may be needed to know extra information from UE about the interfering channel. Assume the channel between the i-th RF chain to user u using beam b is represented as $H_{u_i}(b)$. gNB has already known the following channel $K = [H_{u_1 1}(b_1), H_{u_1 2}(b_2), H_{u_1 3}(b_3), H_{u_1 4}(b_4), H_{u_2 1}(\bar{b}_1), H_{u_2 2}(\bar{b}_2), H_{u_2 3}(\bar{b}_3), H_{u_2 4}(\bar{b}_4)]$.

Some extra information may be requested about the following information at each RF chain, $k(i) = \{H_{u_1 1}(\bar{b}_i), H_{u_2 1}(b_i), \text{if } \bar{b}_i \neq b_i\}$, and the total set channel requested by the UE may be $K_E = \cup_{j \in U_A} \cup_{i=1}^4 k(i)$, where $U_A$ is the set of the active users not scheduled yet. It may be noted that inside each of the k(i) the user index may all be updated correspondingly. In the first feedback design, it may be assumed that additional feedback is required on top of the best beam fed back already from the UE, based on the need of interference modeling. This is a need-driven approach, however, more signaling (e.g., constant requests from the gNB to UE based on the stage the scheduler is in) might be required to be communicated among the gNB and the users.

Due to the limited capability of the UE hardware and the power hungry nature of the various devices, the provided solution might need to impose further constraints over the number of feedback, either artificially or due to practical limits. The following embodiments to elaborate on the further details are provided.

In one embodiment 16, users are categorized into different sets $\mho_i$, i=1, 2, 3, 4 based on the feedback capability, i.e., the maximum number of beams i it can support to feedback to the gNB. i could either be 1 which is the case that it can only feedback the best beam, without the ability to feedback additional beam information; or it can feedback multiple, but the maximum number of beams it can support is limited by 4. Therefore, in each of feedback, based on the chronological order of the scheduling phase, the beams at each UE may be fed back one by one, until the beam reaches the upper limit of the beam's feedback capability.

In one embodiment 17, users are still categorized into different sets $\mho_i$, i=1, 2, 3, 4 based on the feedback capability. Here, it may impose the constraints that apart from the users with the capability of only feeding back 1 best beam, i.e., $\mho_1$, other users feedback (the most) 2 best beams in total under all conditions.

In the second beam feedback, better solutions which balance the amount of requests initiated at the gNB and the overheads of contents that are fed back to the gNB from the UE are provided. In the second approach, it may not specify the requested beam from the different UEs of each stage. Instead, it may come with some common beam indexes for all UEs that can be requested by gNB, which can largely relieve the loads in the beam feedback request process. In particular, the beam index based on the special structure of the hybrid scheduler (and this scheme is designed specifically for the hybrid scheduler using MU and SDMA) is determined.

Given the beam index of the first scheduled user as $B = F_B(u_1) = [b_1, b_2, b_3, b_4]$ and the close beam bitmap matrix $\Theta$, for each of the RF chain i, it may sort out the close beam indexes set $\mathbb{C}_i$, that are close to the beam currently used for the first user scheduled. And $\mathbb{C}_i$ is defined as $\mathbb{C}_i = \{k : \Theta(b_i, k) = 1\}$. In this case, since gNB has knowledge of the single-user index and the corresponding beam, in the beam request stage, it simply needs to send out the set of beam indexes $\mathbb{C}_i$, i=1, 2, 3, 4 for each of the RF chain to all UEs and ask UEs to feedback the channel information using beam inside $\mathbb{C}_i$ at each RF chain i. This can largely reduce the overheads in the request phase, but there might be more beam feedbacks involved, since it is more of like a "blind" approach for searching for additional beam feedback from user without being driven by the specific needs in scheduling. And parts of the beam information which is actually fed back might not be useful in the scheduling. Therefore, there also exists some tradeoff between the beam feedback design 1 driven by scheduling needs and the current solution based on some "blind" beam requests. The idea is that the feedback needs to be specially designed to fit the needs and the protocols used for the scheduling. There could also be some hybrid way of combining the two approaches, which can be investigated further in the future.

In one embodiment 17, users are categorized into different sets $\mho_i$, i=1, 2, 3, 4 based on the feedback capability. The user assistance approach requests identical number of beams fed back from the users, which might not be the case in the feedback due to the various capabilities of beam feedback among users. Therefore, it may limit the number of $\mathbb{C}_i$ to be identical as 2 for all users with multi-beam feedback capacity.

In one embodiment 18, users are categorized into different sets $\mho_i$, i=1, 2, 3, 4 based on the feedback capability. The beams fed back from each UE are represented by, and among all beams in $\mathbb{C}$, based on the UE feedback capability, it is feeding back at most i beams, which is closest to the beam used at the gNB, based on the correlation factor C.

The hybrid signaling scheme based on the signaling components in network controlled approach and UE assistance approach is also possible.

Figure 20:
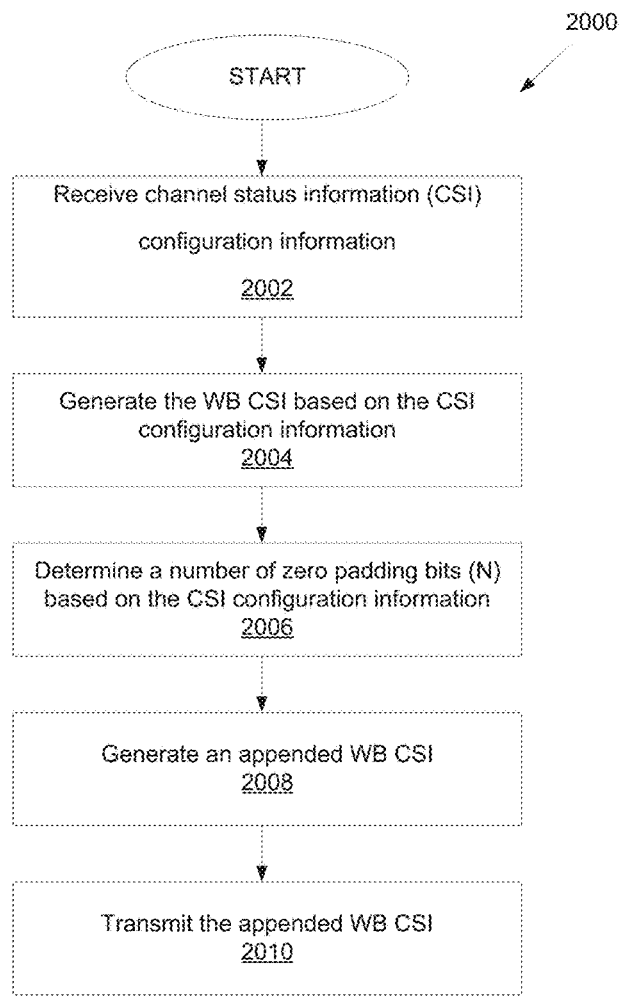
FIG. 20 illustrates a flow chart of a method for wideband CSI reporting according to embodiments of the present disclosure.

FIG. 20 illustrates a flow chart of a method 2000 for wideband CSI reporting according to embodiments of the present disclosure, as may be performed by a user equipment (UE) (e.g., 111-116 as illustrated in FIG. 1). The embodiment of the method 2000 illustrated in FIG. 20 is for illustration only. FIG. 20 does not limit the scope of this disclosure to any particular implementation 2000.

As illustrated in FIG. 20, the method 200 begins at step 2002.

In step 2002, the UE receives, from a base station (BS), channel status information (CSI) configuration information for a wideband CSI (WB CSI). In step 2002, the a number of payload bits varies across WB CSI candidates and the number of zero padding bits (N) is determined by N=$N_{max}$−$N_{reported}$.

In one embodiment, the WB CSI includes all or a subset of CSI-RS resource indicator (CRI), rank indicator (RI), layer indicator (LI), precoding matrix indicator (PMI), and CQI for 2 CSI-RS ports and all or a subset of CRI, RI, LI, PMI i1, PMI i2, and CQI for more than 2 CSI-RS ports; and the N consecutive zero bits are inserted between the payload bits for a first set and a second set for 2 CSI-RS ports and between the payload bits for the first set and a third set for more than 2 CSI-RS ports, and wherein: the first set comprises CRI, RI, and LI; the second set comprises PMI and CQI; and the third set comprises PMI i1, PMI i2, and CQI.

In step 2004, the UE generates the WB CSI based on the CSI configuration information.

In step 2006, the UE determines a number of zero padding bits (N) based on the CSI configuration information, wherein the number of zero padding bits (N) is determined based on a maximum payload bits ($N_{max}$) over all WB CSI candidates and an actual payload bits ($N_{reported}$) for the generated WB CSI.

In step 2006, the actual payload bits ($N_{reported}$) is determined by $N_{reported}$=B(R) where R=reported rank and the maximum payload bits ($N_{max}$) is determined by $N_{max}$=$\max_{r \in S_{Rank}}$ B(r) where $S_{Rank}$=set of rank values (r) that are allowed to be reported.

In one embodiment, the B(r) is determined by B(r)=$N_{PMI}$(r)+$N_{CQI}$(r)+$N_{LI}$(r) for 2 CSI reference signal (CSI-RS) ports and B(r)=$N_{PMI\ i_1}$(r)+$N_{PMI\ i_2}$(r)+$N_{CQI}$(r)+$N_{LI}$(r) for more than 2 CSI-RS ports.

In such embodiment, a number of bits of payload $N_{PMI}$ is determined as $N_{PMI}$(1)=2 and $N_{PMI}$(2)=1 when a precoding matric indicator (PMI) is reported to the BS, and the number of bits of payload $N_{PMI}$ is determined as $N_{PMI}$(r)=0 when the PMI is not reported to the BS; a number of bits of payload $N_{PMI\ i_1}$ determined as $N_{PMI\ i_1}$(r)=number of bits to report PMI components that are reported in a WB manner, when a PMI i1 is reported to the BS, and the number of bits of payload $N_{PMI\ i_1}$ is determined as $N_{PMI\ i_1}$(r)=0 when the PMI i1 is not reported to the BS; a number of bits of payload $N_{PMI\ i_2}$ determined as $N_{PMI\ i_2}$(r)=number of bits to report PMI components that can be reported in either WB or subband (SB) manner, when a PMI i2 is reported to the BS, and the number of bits of payload $N_{PMI\ i_2}$ determined as $N_{PMI\ i_2}$(r)=0 when the PMI i2 is not reported to the BS; a number of bits of payload $N_{CQI}$(r) is determined as 4 if R≤4 and 8 if R>4 when channel quality information (CQI) is reported to the BS, and a number of bits of payload $N_{CQI}$(r) is determined as $N_{CQI}$(r)=0 when the CQI is not reported to the BS; and a number of bits of payload $N_{LI}$(r) is determined as $\lceil \log_2 R \rceil$ for 2 CSI-RS ports and $\min(2, \lceil \log_2 R \rceil)$ for more than 2 CSI-RS ports, when a layer indicator (LI) is reported to the BS, and the number of bits of payload $N_{LI}$(r) is determined as $N_{LI}$(r)=0 when the LI is not reported to the BS.

In step 2008, the UE generates an appended WB CSI by inserting N consecutive zero bits into the actual payload bits ($N_{reported}$) for the generated WB CSI.

In step 2010, the UE transmits, to the BS, the appended WB CSI over an uplink channel.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) in a wireless communication system, the UE comprising:
   a transceiver configured to receive, from a base station (BS), channel status information (CSI) configuration information for a wideband CSI (WB CSI); and
   a processor operably connected to the transceiver, the processor configured to:
      generate the WB CSI based on the CSI configuration information;
      determine a number of zero padding bits (N) based on the CSI configuration information, wherein the number of zero padding bits (N) is determined based on a maximum payload bits ($N_{max}$) over all WB CSI candidates and an actual payload bits ($N_{reported}$) for the generated WB CSI; and generate an appended WB CSI by inserting N consecutive zero bits into the actual payload bits ($N_{reported}$) for the generated WB CSI, wherein the transceiver is further configured to transmit, to the BS, the appended WB CSI over an uplink channel.

2. The UE of claim 1, wherein a number of payload bits varies across WB CSI candidates.

3. The UE of claim 1, wherein the number of zero padding bits (N) is determined by $N=N_{max}-N_{reported}$.

4. The UE of claim 3, wherein:

the actual payload bits ($N_{reported}$) is determined by $N_{reported}=B(R)$ where R=reported rank; and the maximum payload bits ($N_{max}$) is determined by $N_{max}=\max_{r \in S_{Rank}} B(r)$ where $S_{Rank}$=set of rank values (r) that are allowed to be reported.

5. The UE of claim 4, wherein the B(r) is determined by:

$B(r)=N_{PMI}(r)+N_{CQI}(r)+N_{LI}(r)$ for 2 CSI reference signal (CSI-RS) ports;

$B(r)=N_{PMI i_1}(r)\ N_{PMI i_2}(r)+N_{CQI}(r)+N_{LI}(r)$ for more than 2 CSI-RS ports; and $N_{PMI}$ is a number of bits of payload $N_{PMI}$ for a precoding matrix indicator (PMI), $N_{PMI i_1}$ is a number of bits of payload $N_{PMI i_1}$ for a PMI i1, $N_{PMI i_2}$ is a number of bits of payload $N_{PMI i_2}$ for a PMI i2, $N_{CQI}$ is a number of bits of payload $N_{CQI}$ for channel quality information (CQI), and $N_{LI}$ is a number of bits of payload $N_{LI}$ for a layer indicator (LI).

6. The UE of claim 5, wherein:

the number of bits of payload $N_{PMI}$ is determined as $N_{PMI}(1)=2$ and $N_{PMI}(2)=1$ when the PMI is reported to the BS, and the number of bits of payload $N_{PMI}$ is determined as $N_{PMI}(r)=0$ when the PMI is not reported to the BS;

the number of bits of payload $N_{PMI i_1}$ is determined as $N_{PMI i_1}(r)$=number of bits to report PMI components that are reported in a WB manner, when the PMI i1 is reported to the BS, and the number of bits of payload $N_{PMI i_1}$ is determined as $N_{PMI i_1}(r)=0$ when the PMI i1 is not reported to the BS;

the number of bits of payload $N_{PMI i_2}$ is determined as $N_{PMI i_2}(r)$=number of bits to report PMI components that can be reported in either WB or subband (SB) manner, when the PMI i2 is reported to the BS, and the number of bits of payload $N_{PM i_2}$ is determined as $N_{PMI i_2}(r)=0$ when the PMI i2 is not reported to the BS;

the number of bits of payload $N_{CQI}(r)$ is determined as 4 if R≤4 and 8 if R>4 when the CQI is reported to the BS, and a number of bits of payload $N_{CQI}(r)$ is determined as $N_{CQI}(r)=0$ when the CQI is not reported to the BS; and the number of bits of payload $N_{LI}(r)$ is determined as $\lceil \log_2 R \rceil$ for 2 CSI-RS ports and $\min(2, \lceil \log_2 R \rceil)$ for more than 2 CSI-RS ports, when the LI is reported to the BS, and the number of bits of payload $N_{LI}(r)$ is determined as $N_{LI}(r)=0$ when the LI is not reported to the BS.

7. The UE of claim 1, wherein:

the WB CSI includes all or a subset of CSI-RS resource indicator (CRI), rank indicator (RI), layer indicator (LI), precoding matrix indicator (PMI), and CQI for 2 CSI-RS ports and all or a subset of CRI, RI, LI, PMI i1, PMI i2, and CQI for more than 2 CSI-RS ports; and the N consecutive zero bits are inserted between the payload bits for a first set and a second set for 2 CSI-RS ports and between the payload bits for the first set and a third set for more than 2 CSI-RS ports, and wherein:

the first set comprises CRI, RI, and LI;

the second set comprises PMI and CQI; and the third set comprises PMI i1, PMI i2, and CQI.

8. A base station (BS) in a wireless communication system, the BS comprising:

a transceiver configured to:

transmit, to a user equipment (UE), channel status information (CSI) configuration information for a wideband CSI (WB CSI); and receive, from the UE, an appended WB CSI over an uplink channel, wherein the appended WB CSI is generated by inserting N consecutive zero bits into actual payload bits ($N_{reported}$) for the WB CSI that is generated based on the CSI configuration information, and wherein a number of zero padding bits (N) is determined based on a maximum payload bits ($N_{max}$) over all WB CSI candidates and the actual payload bits ($N_{reported}$) for the generated WB CSI.

9. The BS of claim 8, wherein a number of payload bits varies across WB CSI candidates.

10. The BS of claim 8, wherein the number of zero padding bits (N) is determined by $N=N_{max}-N_{reported}$.

11. The BS of claim 10, wherein:

the actual payload bits ($N_{reported}$) is determined by $N_{reported}=B(R)$ where R=reported rank; and the maximum payload bits ($N_{max}$) is determined by $N_{max}=\max_{r \in S_{Rank}} B(r)$ where $S_{Rank}$=set of rank values (r) that are allowed to be reported.

12. The BS of claim 11, wherein the B(r) is determined by:

$B(r)=N_{PMI}(r)+N_{CQI}(r)+N_{LI}(r)$ for 2 CSI reference signal (CSI-RS) ports;

$B(r)=N_{PMI i_1}(r)+N_{PMI i_2}(r)+N_{CQI}(r)+N_{LI}(r)$ for more than 2 CSI-RS ports; and $N_{PMI}$ is a number of bits of payload $N_{PMI}$ for a precoding matrix indicator (PMI), $N_{PMI i_1}$ is a number of bits of payload $N_{PMI i_1}$ for a PMI i1, $N_{PMI i_2}$ is a number of bits of payload $N_{PMI i_2}$ for a PMI i2, $N_{CQI}$ is a number of bits of payload $N_{CQI}$ for channel quality information (CQI), and $N_{LI}$ is a number of bits of payload $N_{LI}$ for a layer indicator (LI).

13. The BS of claim 12, wherein:

the number of bits of payload $N_{PMI}$ is determined as $N_{PMI}(1)=2$ and $N_{PMI}(2)=1$ when the PMI is reported to the BS, and the number of bits of payload $N_{PMI}$ is determined as $N_{PMI}(r)=0$ when the PMI is not reported to the BS;

the number of bits of payload $N_{PMI i_1}$ is determined as $N_{PMI i_2}(r)$=number of bits to report PMI components that are reported in a WB manner, when the PMI i1 is reported to the BS, and the number of bits of payload $N_{PMI i_1}$ is determined as $N_{PMI i_1}(r)=0$ when the PMI i1 is not reported to the BS;

the number of bits of payload $N_{PMI i_2}$ is determined as $N_{PMI i_2}(r)$=number of bits to report PMI components that can be reported in either WB or subband (SB) manner, when the PMI i2 is reported to the BS, and the number of bits of payload $N_{PMI i_2}$ is determined as $N_{PMI i_2}(r)=0$ when the PMI i2 is not reported to the BS;

the number of bits of payload $N_{CQI}(r)$ is determined as 4 if R≤4 and 8 if R>4 when the CQI is reported to the BS, and a number of bits of payload $N_{CQI}(r)$ is determined as $N_{CQI}(r)=0$ when the CQI is not reported to the BS; and the number of bits of payload $N_{LI}(r)$ is determined as $\lceil \log_2 R \rceil$ for 2 CSI-RS ports and $\min(2,\lceil \log_2 R \rceil)$ for more than 2 CSI-RS ports, when the LI a layer indicator (LI) is reported to the BS, and the number of bits of payload $N_{LI}(r)$ is determined as $N_{LI}(r)=0$ when the LI is not reported to the BS.

14. The BS of claim 8, wherein:
the WB CSI includes all or a subset of CSI-RS resource indicator (CRI), rank indicator (RI), layer indicator (LI), precoding matrix indicator (PMI), and CQI for 2 CSI-RS ports and all or a subset of CRI, RI, LI, PMI i1, PMI i2, and CQI for more than 2 CSI-RS ports; and
the N consecutive zero bits are inserted between the payload bits for a first set and a second set for 2 CSI-RS ports and between the payload bits for the first set and a third set for more than 2 CSI-RS ports, and wherein:
the first set comprises CRI, RI, and LI;
the second set comprises PMI and CQI; and
the third set comprises PMI i1, PMI i2, and CQI.

15. A method of a user equipment (UE) in a wireless communication system, the method comprising:
receiving, from a base station (BS), channel status information (CSI) configuration information for a wideband CSI (WB CSI);
generating the WB CSI based on the CSI configuration information;
determining a number of zero padding bits (N) based on the CSI configuration information, wherein the number of zero padding bits (N) is determined based on a maximum payload bits ($N_{max}$) over all WB CSI candidates and an actual payload bits ($N_{reported}$) for the generated WB CSI;
generating an appended WB CSI by inserting N consecutive zero bits into the actual payload bits ($N_{reported}$) for the generated WB CSI; and
transmitting, to the BS, the appended WB CSI over an uplink channel.

16. The method of claim 15, wherein:
a number of payload bits varies across WB CSI candidates; and
the number of zero padding bits (N) is determined by $N=N_{max}-N_{reported}$.

17. The method of claim 16, wherein:
the actual payload bits ($N_{reported}$) is determined by $N_{reported}=B(R)$ where R=reported rank; and
the maximum payload bits ($N_{max}$) is determined by $N_{max}=\max_{r \in S_{Rank}} B(r)$ where $S_{Rank}$=set of rank values (r) that are allowed to be reported.

18. The method of claim 17, wherein the B(r) is determined by:

$B(r)=N_{PMI}(r)+N_{CQI}(r)+N_{LI}(r)$ for 2 CSI reference signal (CSI-RS) ports;
$B(r)=N_{PMI\ i_1}(r)+N_{PMI\ i_2}(r)+N_{CQI}(r)+N_{LI}(r)$ for more than 2 CSI-RS ports; and
$N_{PMI}$ is a number of bits of payload $N_{PMI}$ for a precoding matrix indicator (PMI), $N_{PMI\ i_1}$ is a number of bits of payload $N_{PMI\ i_1}$ for a PMI i1, $N_{PMI\ i_2}$ is a number of bits of payload $N_{PMI\ i_2}$ for a PMI i2, $N_{CQI}$ is a number of bits of payload $N_{CQI}$ for channel quality information (CQI), and $N_{LI}$ is a number of bits of payload $N_{LI}$ for a layer indicator (LI).

19. The method of claim 18, wherein:
the number of bits of payload $N_{PMI}$ is determined as $N_{PMI}(1)=2$ and $N_{PMI}(2)=1$ when the PMI is reported to the BS, and the number of bits of payload $N_{PMI}$ is determined as $N_{PMI}(r)=0$ when the PMI is not reported to the BS;
the number of bits of payload $N_{PMI\ i_1}$ is determined as $N_{PMI\ i_1}(r)$=number of bits to report PMI components that are reported in a WB manner, when the PMI i1 is reported to the BS, and the number of bits of payload $N_{PMI\ i_1}$ is determined as $N_{PMI\ i_1}(r)=0$ when the PMI i1 is not reported to the BS;
the number of bits of payload $N_{PMI\ i_2}$ is determined as $N_{PMI\ i_2}(r)$=number of bits to report PMI components that can be reported in either WB or subband (SB) manner, when the PMI i2 is reported to the BS, and the number of bits of payload $N_{PMI\ i_2}$ is determined as $N_{PMI\ i_2}(r)=0$ when the PMI i2 is not reported to the BS;
the number of bits of payload $N_{CQI}(r)$ is determined as 4 if R≤4 and 8 if R>4 when the CQI is reported to the BS, and a number of bits of payload $N_{CQI}(r)$ is determined as $N_{CQI}(r)=0$ when the CQI is not reported to the BS; and
the number of bits of payload $N_{LI}(r)$ is determined as $\lceil \log_2 R \rceil$ for 2 CSI-RS ports and $\min(2,\lceil \log_2 R \rceil)$ for more than 2 CSI-RS ports, when the LI a layer indicator (LI) is reported to the BS, and the number of bits of payload $N_{LI}(r)$ is determined as $N_{LI}(r)=0$ when the LI is not reported to the BS.

20. The method of claim 15, wherein:
the WB CSI includes all or a subset of CSI-RS resource indicator (CRI), rank indicator (RI), layer indicator (LI), precoding matrix indicator (PMI), and CQI for 2 CSI-RS ports and all or a subset of CRI, RI, LI, PMI i1, PMI i2, and CQI for more than 2 CSI-RS ports; and
the N consecutive zero bits are inserted between the payload bits for a first set and a second set for 2 CSI-RS ports and between the payload bits for the first set and a third set for more than 2 CSI-RS ports, and wherein:
the first set comprises CRI, RI, and LI;
the second set comprises PMI and CQI; and
the third set comprises PMI i1, PMI i2, and CQI.

* * * * *